US012723993B2

(12) United States Patent
Vecchio et al.

(10) Patent No.: US 12,723,993 B2
(45) Date of Patent: Sep. 1, 2026

(54) ASSESSMENT OF UTILITY COMPONENTS USING AIRBORNE REMOTE SENSING

(71) Applicant: Florida Power & Light Company, Juno Beach, FL (US)

(72) Inventors: Mackenzie Vecchio, Boca Raton, FL (US); Eric D. Schwartz, Palm Beach Gardens, FL (US); Jackson A Beebe, Juno Beach, FL (US); John P. Cannon, Mangonia Park, FL (US); Paul R. Hynes, Jupiter, FL (US)

(73) Assignee: Florida Power & Light Company, Juno Beach, FL (US)

( * ) Notice: Subject to any disclaimer, the term of this patent is extended or adjusted under 35 U.S.C. 154(b) by 143 days.

(21) Appl. No.: 18/748,783

(22) Filed: Jun. 20, 2024

(65) Prior Publication Data

US 2025/0389673 A1 Dec. 25, 2025

(51) Int. Cl.
*G01N 21/952* (2006.01)
*G01S 17/89* (2020.01)
(Continued)

(52) U.S. Cl.
CPC ............ *G01N 21/952* (2013.01); *G01S 17/89* (2013.01); *G05D 1/646* (2024.01); *G05D 1/69* (2024.01);
(Continued)

(58) Field of Classification Search
None
See application file for complete search history.

(56) References Cited

U.S. PATENT DOCUMENTS 9,048,639 B2 6/2015 Hyde et al.
9,384,399 B2 7/2016 Bangay
(Continued)

FOREIGN PATENT DOCUMENTS

CN 111025325 4/2020
CN 109254303 3/2021
(Continued)

OTHER PUBLICATIONS

Ecko. (Jun. 30, 2023). Aerial LiDAR: A gamechanger for disaster response. https://www.linkedin.com/pulse/aerial-lidar-gamechanger-disaster-response-ecko360.
(Continued)

*Primary Examiner* — Andrew H Lam
(74) *Attorney, Agent, or Firm* — TROUTMAN PEPPER LOCKE LLP; Dustin B. Weeks

(57) ABSTRACT

A system and method that reduces the time needed to identify infrastructure that has been damaged due to a storm, earthquake, or other event. At a high level, the presently claimed invention includes the following steps. Step 1: Assigned airborne response equipped with high-powered lidar sensors to fly over impacted areas to collect a 3D point cloud. This data focuses on the 3D geometry of the built environment and may be processed in a highly automated fashion to derive the locations of downed poles and wires. Step 2: run automated processes to identify highly impacted areas—providing an output of precise XY locations of downed poles and wires. And step 3: develop unique resource allocation response given the areas of known major damage.

20 Claims, 17 Drawing Sheets

(51) Int. Cl.

| | |
|---|---|
| ***G05D 1/646*** | (2024.01) |
| ***G05D 1/69*** | (2024.01) |
| ***G05D 101/15*** | (2024.01) |
| ***G05D 105/80*** | (2024.01) |
| ***G05D 109/20*** | (2024.01) |
| ***G05D 111/10*** | (2024.01) |
| ***H04W 4/18*** | (2009.01) |

(52) U.S. Cl.

CPC .... *H04W 4/185* (2013.01); *G01N 2201/0214* (2013.01); *G01N 2201/1087* (2013.01); *G05D 2101/15* (2024.01); *G05D 2105/89* (2024.01); *G05D 2109/20* (2024.01); *G05D 2111/17* (2024.01)

(56) References Cited

U.S. PATENT DOCUMENTS

| | | | | |
|---|---|---|---|---|
| 9,460,520 | B2 | 10/2016 | Haglund et al. | |
| 10,032,267 | B2 | 7/2018 | Strebel et al. | |
| 10,046,187 | B2 | 8/2018 | Doten | |
| 10,382,975 | B2 | 8/2019 | Priest | |
| 10,628,802 | B2 | 4/2020 | Durand et al. | |
| 10,850,840 | B2 | 12/2020 | Schwartz et al. | |
| 10,880,623 | B2 | 12/2020 | Saha et al. | |
| 11,157,741 | B2 | 10/2021 | Freitas Cunha et al. | |
| 11,275,376 | B2 | 3/2022 | Rentz et al. | |
| 11,561,251 | B2 | 1/2023 | Schwartz et al. | |
| 11,710,191 | B2 | 7/2023 | Tofte et al. | |
| 2017/0092109 | A1* | 3/2017 | Trundle | B60L 53/36 |
| 2018/0314995 | A1 | 11/2018 | Katz et al. | |
| 2020/0401138 | A1* | 12/2020 | Rentz | G05D 1/104 |
| 2022/0285980 | A1 | 9/2022 | Radgowski et al. | |

FOREIGN PATENT DOCUMENTS

| | | |
|---|---|---|
| CN | 114859368 | 8/2022 |
| GB | 2020566.2 | 6/2022 |
| KR | 102303783 | 9/2021 |

OTHER PUBLICATIONS

Florida Power and Light Company Launches FPLAir One Drone |. (Oct. 2022). https://www.eei.org/en/delivering-the-future/articles/florida-power-and-light-company-launches-fplair-one-drone.

Green Grid Inc (2020) Protection Against Wildfires, catalog.

Gerhard, J. (Aug. 15, 2019). Vital Deployment of Lidar Data for Emergency Response-Rapid, Effective, Essential—LIDAR Magazine. LIDAR Magazine. https://lidarmag.com/2018/07/17/vital-deployment-of-lidar-data-for-emergency-response-rapid-effective-essential/.

* cited by examiner

500

| | DEVICE ID 508 | DEVICE TYPE 510 | ENVRN CPBLTY 512 | POWER SOURCES 514 | COMM 516 | SENSOR/ FEATURES 518 | MOBILITY 520 | OP FEATURES 522 | LOC 524 | OP TIME 526 | OP COSTS 528 | ... |
|---|---|---|---|---|---|---|---|---|---|---|---|---|
| 502 | DEV_1 530 | TYPE_A 532 | CPBLTY_A 534 | PWR_A 536 | COM_A 538 | FTRS_A 540 | MOB_A 542 | OP_A 544 | LOC_A 546 | TM_A 548 | CST_A 550 | ... |
| 504 | DEV_2 | TYPE_B | CPBLTY_B | PWR_B | COM_B | FTRS_B | MOB_B | OP_B | LOC_B | TM_B | CST_B | ... |
| | ... | ... | ... | ... | ... | ... | ... | ... | ... | ... | ... | ... |
| 506 | DEV_N | TYPE_N | CPBLTY_N | PWR_N | COM_N | FTRS_N | MOB_N | OP_N | LOC_N | TM_N | CST_N | ... |

| | AOD ID 608 | LOCATION 610 | SIZE 612 | TERRAIN TYPE 614 | ELEVATION 616 | FEATURES 618 | HISTORICAL WEATHER 620 |
|---|---|---|---|---|---|---|---|
| 602 | AOD_1 622 | LOC_A 624 | SIZE_A 626 | TER_A 628 | ELV_A 630 | FTRS_A 632 | HWTHR_A 634 |
| 604 | AOD_2 | LOC_B | SIZE_A | TER_B | ELV_B | FTRS_B | HWTHR_B |
| | ... | ... | ... | ... | ... | ... | ... |
| 606 | AOI_N | LOC_N | SIZE_N | TER_N | ELV_N | FTRS_N | HWTHR_N |

| | COMPONENT ID 708 | COMPONENT TYPE 710 | AOI 712 | PART NUMBER 714 | LOCATION 716 | FUNCTION 718 | ... |
|---|---|---|---|---|---|---|---|
| 702 | CID_1 720 | TYPE_A 722 | AOI_1 724 | PRT_A 726 | LOC_1 728 | FNC_A 730 | ... |
| 704 | CID_2 | TYPE_B | AOI_2 | PRT_B | LOC_2 | FNC_B | ... |
| | ... | | ... | ... | ... | ... | ... |
| 706 | CID_N | TYPE_N | AOI_N | PRT_N | LOC_N | FNC_N | ... |

| | INSPECTION PATH ID 810 | DEVICE ID 812 | COORDINATE DATA 814 | ALTITUDE DATA 816 | SPEED DATA 818 | TEMPORAL DATA 820 | INSPECTION ANGLE(S) 822 | ... |
|---|---|---|---|---|---|---|---|---|
| 802 | IP_1 824 | DEV_A 826 | CRDSET_A 828 | ALTSET_A 830 | SPDSET_A 832 | T_A 834 | ANG_A ANG_B 836 | ... |
| 804 | IP_2 | DEV_B | CRDSET_B | ALTSET_B | SPDSET_B | T_B | ANG_C | ... |
| 806 | IP_3 | DEV_C | CRDSET_C | ALTSET_C | SPDSET_C | T_C | ANG_D | ... |
| | ... | ... | ... | ... | ... | | | ... |
| 808 | IP_N | DEV_N | CRDSET_N | ALTSET_N | SPDSET_N | T_N | ANG_N ANG_X | ... |

| | 908 | 910 | 912 | 914 | 916 | 918 | 920 | 922 | |
|---|---|---|---|---|---|---|---|---|---|
| | COMPONENT ID | AOI | LOCATION | OP STATE | DAMAGE TYPE(S) | DAMAGE PART(S) | TIME | WEATHER | ... |
| 902 | CID_1 924 | AOI_1 926 | LOC_1 928 | OP 930 | N/A 932 | N/A 934 | T_A 936 | WTHR_A 938 | ... |
| 904 | CID_2 | AOI_A | LOC_2 | NON_OP | DMG_A | PART_A | T_B | WTHR_B | ... |
| | ... | ... | ... | ... | ... | ... | | ... | ... |
| 906 | CID_N | AOI_Y | LOC_N | OBSTR | DMG_N | PART_N | T_N | WTHR_N | ... |

FIG. 9

Change Detection

Results

Baseline point cloud from Vegetation Management in Green

Change from post-strom point cloud in Red

ASSESSMENT OF UTILITY COMPONENTS USING AIRBORNE REMOTE SENSING

FIELD OF THE DISCLOSURE

The present invention generally relates to utility systems, and more particularly to monitoring and inspecting utility system components.

BACKGROUND

The North American power grid has been characterized by the Smithsonian Institution as the largest machine ever built by mankind. The size, geographic diversity, environmental diversity, and the many components comprising the power grid present unique challenges in the rapid and efficient system upgrading with diverse new technologies that realize America's objective of improved power grid reliability and hardening. Accordingly, utility systems are an integral part of modern day life. Unfortunately, components of these systems may become inoperable. For example, consider an electrical power substation that is part of a power grid. Substations perform various functions, such as transforming voltage, connecting two or more transmission lines, transferring power, and protecting the grid from short circuits and overload currents. In many instances, substation equipment is susceptible to damage, which may result in power outages throughout the grid. Power outages decrease customer satisfaction, and damaged substation equipment increases costs incurred by the utility provider.

Reducing time to action enables emergency responders to provide lifesaving support in major disaster events such as hurricanes. In order to most effectively allocate resources, those in charge of restoration and response efforts need to understand where the most highly impacted areas are, and for electric utilities, the focus is on downed poles and wires.

Damage to electric utility infrastructure may be caused by a variety of scenarios such as tropical cyclones, tornadoes, lightning storms, hailstorms, blizzards, wildfires, earthquakes, tsunamis, avalanches, landslides, volcanic eruptions, or manmade disasters such as dam failures or bombings. No matter the cause of asset damage at scale, utility resource planners need a way to effectively know which areas have considerable damage, such as downed poles and wires.

SUMMARY OF THE INVENTION

Reducing time to action enables emergency responders to provide lifesaving support in major disaster events such as hurricanes. In-order to most effectively allocate resources those in charge of restoration and response efforts need to understand where the most highly impacted areas are—and for electric utilities the focus is on downed poles and wires.

Damage to electric utility infrastructure may be caused from a variety of scenarios such as tropical cyclones, tornadoes, lightning storms, hailstorms, blizzards, wildfires, earthquakes, tsunamis, avalanche, landslides, volcanic eruptions, or manmade disasters such as dam failures or bombings. No matter the cause of asset damage at scale, utility resource planners need a way to effectively know which areas have considerable damage such as downed poles and wires.

Disclosed is a system and method to reduce the time needed to identify infrastructure that has been damaged due to a storm, earthquake, or other event. At a high level, the presently claimed invention includes the following steps.

Step 1: Assigned airborne response equipped with high-powered lidar sensors to fly over impacted areas to collect a 3D point cloud. This data focuses on the 3D geometry of the built environment and may be processed in a highly automated fashion to derive the locations of downed poles and wires. Step 2: run automated processes to identify highly impacted areas—providing an output of precise XY locations of downed poles and wires. And step 3: develop unique resource allocation response given the areas of known major damage.

More specifically, disclosed is a system and method for detecting an abnormality on a utility infrastructure. The method begins with establishing a historical basis of scan data of utility infrastructure. This historical basis is created by selecting a predefined flight path from a plurality of predefined flight paths based a location of utility infrastructure to be inspected. An aerial vehicle is instructed to traverse the at least one predefined flight path that has been selected. Remote sensing during flight is accomplished using Light Detection and Ranging (LiDAR) remote sensing during the aerial vehicle traversing the predefined flight path, to create a first set of scan data in a 3D coordinate system of the utility infrastructure along with corresponding location coordinates and yaw, pitch, and roll of the aerial vehicle. The data captured by LiDAR may be converted from a native LiDAR sensor data format into LAS or LAZ format.

Next, the method establishes a current basis of scan data of utility infrastructure for comparison. The method begins with selecting a predefined flight corresponding to the location of utility infrastructure to be inspected. Next, an aerial vehicle is instructed to traverse the at least one predefined flight path that has been selected. The second aerial vehicle traverses the predefined path using Lidar remote sensing to create a second set of scan data in a 3D coordinate system of the utility infrastructure along with corresponding location coordinates and yaw, pitch, and roll of the aerial vehicle. Some or all of this data may be processed in flight. The data captured by LiDAR may be converted from a native LiDAR sensor data format into LAS or LAZ format.

Next, the first set of scan data is compared with the second set of scan data by using georeferencing to prioritize identifying utility infrastructure based on settable metrics (e.g., the highest customer count, the highest voltage, the highest volume (for gas or water or waste), critical theatres (military installations, health care facilities, first responders, schools).

Next, the utility infrastructure with a highest priority using vectorization and elevational data is identified. The utility infrastructure with the highest priority is that has been identified using vectorization and elevational data is compared with the first set of scan data using georeferencing. In one example the utility infrastructure with the highest priority that has been identified is compared again the first sect of scan data to identify missing utility structure poles and utility structure poles that exceed a settable tilt angle.

Based on the comparing, presenting on a screen, a discrepancy between the first set of scan data and the second set of scan data corresponding to the utility infrastructure with the highest priority that has been identified, which exceeds a settable threshold.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 shows one example of aerial vehicle data, according to one aspect of the present invention;

FIG. 6 shows one example of area of interest data, according to one aspect of the present invention;

FIG. 7 shows one example of system component data, according to one aspect of the present invention;

FIG. 8 shows one example of inspection path data, according to one aspect of the present invention;

FIG. 9 shows one example of inspection results data, according to one aspect of the present invention;

DETAILED DESCRIPTION

Figure 1:
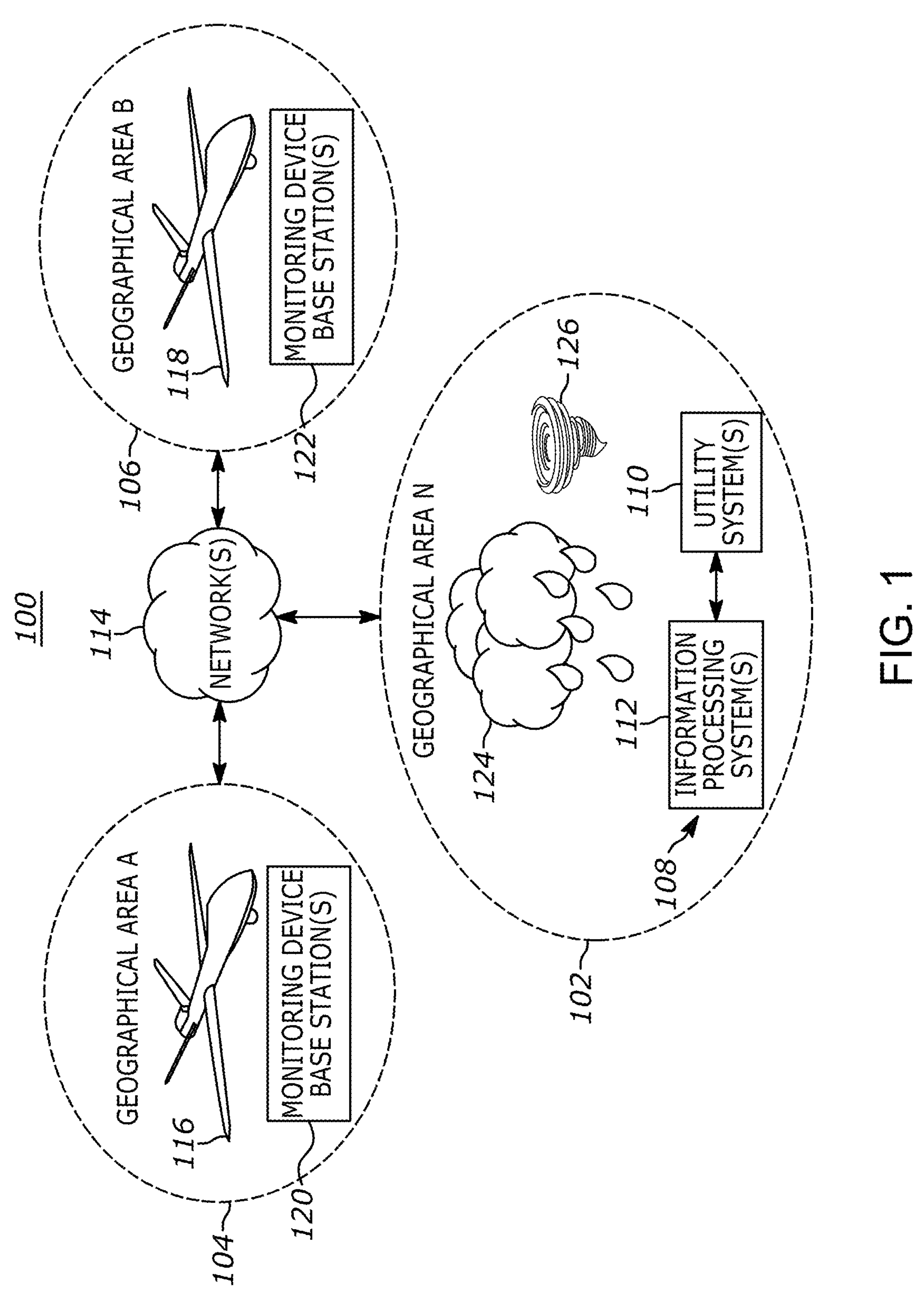
FIG. 1 is a system for aerial vehicle inspection/monitoring of components within areas of interest, according to one aspect of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

Non-Limiting Definitions

The term "3-D measurements" are measurements, typically non-contact measurements, taken of an object to create a 3-D point cloud of an object that is dimensionally accurate and a photorealistic model of the object, such as through photogrammetry.

The term "aerial vehicle" refers to both manned and unmanned aerial systems (UAS including fixed-winged aircraft and lighter-than-air aircraft e.g., airships, dirigibles, and rotary-wing aircraft.

The terms "a" or "an", as used herein, are defined as one or more than one. The term plurality, as used herein, is defined as two or more than two.

The term "adapted to" describes the hardware, software, or a combination of hardware and software that is capable of, able to accommodate, to make, or that is suitable to carry out a given function.

The term "another", as used herein, is defined as at least a second or more.

The term "class" or "classifier" or "label" is a class label applied to data input in a machine learning algorithm.

The term "configured to" describes hardware, software, or a combination of hardware and software that is adapted to, set up, arranged, built, composed, constructed, designed, or that has any combination of these characteristics to carry out a given function.

The term "coupled," as used herein, is defined as "connected," although not necessarily directly and not necessarily mechanically.

The term "inspection parameters" means any type of data to capture, including angles, field-of-view, resolution, and position at which to capture images.

The term "image editing software" means software for editing and manipulating images, such as Blender.org or Photoshop from Adobe.

The terms "including" and "having," as used herein, are defined as comprising (i.e., open language).

The term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The term "optimization" means selecting a flight path segment that best meets the requirement for that specific segment. For example, suppose there is a flight path segment from point A to point B and back to point A. The flight path from point A to point B may closely follow the components, including powerlines of a power grid to monitor the equipment within a certain distance during the inspection itself. This path from point A to point B may not be in a straight line. However, when the flight path segment from point B to point A is generated, there is no need to inspect the components, and the flight path back may be at a higher altitude and along more of a straight path to preserve the battery life of the UAV.

The term "photogrammetry" is a technique to extract three-dimensional measurements of an object for obtaining reliable information, such as three-dimensional measurements, through processing and interpreting a series of photographic images. Photogrammetry may be complemented by techniques like LiDAR, laser scanners (using time of flight, triangulation or interferometry), white-light digitizers and any other technique that scans an area and returns x, y, z coordinates for multiple discrete points, commonly called "point clouds".

The term "real-world" means existing in reality, as opposed to one that is virtual, imaginary, simulated, or theoretical.

The term "simultaneous" means computations are carried out at the same time, which for larger data sets with various constraints is not possible to be carried out completed by a group of humans and must be performed by a computer. For example, one human could not compute one simulation with all the constraints for ten crews across fifty jobs. It is infeasible for a human to calculate one simulation loop with one constraint, let alone perform it in parallel to a sort of global optimum.

The term "synthetic" means creating a computer-generated composite scene including equipment and background in which each of the equipment and the background scene were previously captured independently of each other.

The term "uniform data format" means data in a given format, whether date format, time format, currency format, scientific format, text format, or fractional format, so that all values of data are presented in a single consistent format for a given category or criteria.

The term "unmanned aerial systems" (UAS) and "unmanned aerial vehicle" (UAV) refers to piloted, autonomous, and semi-autonomous aircraft.

It should be understood that the steps of the methods set forth herein are not necessarily required to be performed in the order described, and the order of the steps of such methods should be understood to be merely exemplary. Likewise, additional steps may be included in such methods, and certain steps may be omitted or combined in methods consistent with various embodiments of the present device.

OVERVIEW

The below-described systems and methods provide for safe and efficient aerial vehicle inspection of system components within areas of interest (AOIs) experiencing natural events such as severe wind, rain, fire, etc. utilizing large scale aerial vehicle aerial vehicles. Embodiments of the present invention further facilitate the aerial vehicle generation of work orders for rapid deployment of repair crews. In some embodiments, AOIs are geographical areas comprising utility system components. However, embodiments of the present invention are not limited to utility systems. Components of a utility system may wear down, become damaged, or become inoperable. Depending on the geographical location of these components; current weather conditions; types of damage or operational issues; and/or the like it may be difficult to detect, locate, and remedy the issues within an acceptable amount of time. This may result in increased downtime of the system component(s), which decreases customer satisfaction and increases costs incurred by the utility provider.

Conventional utility system inspection/monitoring mechanisms generally involve dispatching work crews to inspect and identify any worn down or damaged component (s), the extent of damage, the cause of damage, etc. These conventional mechanisms are problematic because they increase the downtime of the system component, increase outages experienced by the customer, increase expenses incurred by the utility provider, etc. For example, it takes time for a crew to reach a site to assess damage, identify inoperable components, and receive repair components. In addition, the work crew may need to operate in dangerous environmental conditions to identify and repair the problematic components. Even further, the environmental conditions (e.g., wind speed) may be such that work crews may be prevented by the conditions, various laws, company policies, and/or the like from traveling to and/or operating in the AOIs. Also, conventional work orders usually do not provide very detailed information or require users to access multiple menus/pages to drill down to information of interest. This can be problematic when viewing work orders on portable electronic devices such as mobile phones, tablets, etc.

Embodiments of the present invention allow for system components, such as utility systems components, to be aerial vehicle monitored and inspected for real-time or near real-time during environmental conditions that may prevent human personnel and/or convention aerial vehicles from operating therein. Therefore, embodiments of the present invention enable the detection and identification of problems experienced by the components during dangerous operating conditions that would normally prevent work crews and aerial vehicles from operating. In addition, the aerial vehicle system is able to process large amounts of data of different types captured by large-scale unmanned aerial vehicles, which allows for more efficient and accurate detection of damaged system components than conventional systems. Work orders may be aerial vehicle generated before (or shortly after) the environmental conditions have subsided, and the required parts, equipment, and work crews identified within the work order may be aerial vehicle provisioned. This provides an advantageous improvement in response time when compared to conventional systems. The above allows for system/component downtime, customer dissatisfaction, and utility expenses to be greatly decreased since work crews do not need to be dispatched to diagnose the problem. In addition, embodiments of the present invention generate an interactive map allowing work crew members to see important work orders, system components, and inspection data information on displays of, for example, mobile phones and tablets without having to parse through multiple windows, menus etc.

Operating Environment

FIG. 1 shows one example of an operating environment 100 for remote aerial vehicle inspection of utility system components. In one embodiment, the operating environment 100 comprises one or more geographical areas 102, 104, 106. At least one geographical area 102 may comprise one or more AOIs 108. The AOI may be a defined area(s) within the geographical area 102 comprising geographical features, components of a utility system 110 situated at various locations within the AOI 108, and/or the like.

Examples of geographical features includes rivers, streams, hills, cliffs, mountains, trees, boulders, and/or the like. Examples of utility systems include power grid systems (e.g., fossil fuel-based, solar-based, wind-based, nuclear-based generation, transmission and/or distribution subsystems), telephone systems (landline and wireless), water systems, gas systems, and oil systems. Each of these different types of utility systems may have multiple types of subsystems. For example, an electric power delivery system generally comprises a generation subsystem, a transmission subsystem, and a distribution subsystem. Each of these subsystems performs one or more specific functions and comprises multiple components. For example, the distribution subsystem of an electric power system comprises substations where each substation performs various functions for a power grid, such as transforming voltage, connecting transmission lines, transferring power, and protecting the grid from short circuits and overload currents, and/or the like. Components of a substation include but are not limited to, incoming and outgoing power lines, transformers, disconnect switches, circuit breakers, arresters, etc. Other non-limiting examples of utility system components include utility poles, transmission lines, solar panels, cooling towers, pipelines, and/or the like.

The operating environment 100 may further comprise one or more information processing systems 112 disposed within one or more of the geographical areas 102 to 106. As will be discussed in greater detail below, the information processing system(s) 112 may manage the aerial vehicle inspection of utility system components, generation of work orders, and provisioning of resources. The information processing system(s) 112 may be located within the same geographical area as the AOI 108 being inspected or be located within a geographical area that is remote from the AOI 108 being inspected.

The information processing system(s) 112 may be communicatively coupled to other components of the operating environment 100 (and components outside the environment 100) by one or more networks 114. The network 114 may comprise wired and/or wireless networking mechanisms and may further comprise wireless communication networks, non-cellular networks such as Wireless Fidelity (WiFi) networks, public networks such as the Internet, private networks, and/or the like. The wireless communication networks support any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication networks may include one or more networks based on such standards. For example, in one embodiment, a wireless communication network may comprise one or more of a Long Term Evolution (LTE) network, LTE Advanced (LTE-A) network, an Evolution Data Only (EV-DO) network, a General Packet Radio Service (GPRS) network, a Universal Mobile Telecommunications System (UMTS) network, and the like.

FIG. 1 further shows that the operating environment 100 may comprise one or more monitoring/inspection devices 116, 118 disposed at a location(s) within one or more of the geographical areas 102 to 106. As will be discussed in greater detail below, the aerial vehicles 116, 118 may be configured to remotely and aerial vehicle inspect utility system components. The aerial vehicles 116, 118 may be associated with a base station(s) 120, 122 located within one or more of the geographical areas 102 to 106. The base station(s) 120, 122 may comprise charging/fueling areas for the devices 116, 118; shelter for the devices 116, 118; and/or the like.

In some embodiments, the aerial vehicle monitoring/inspection devices 116, 118 may be unmanned mobile aerial vehicles such as (but are not limited to) unmanned aerial vehicles (UAVs), drones, rovers, climbing robots, and/or the like having monitoring systems such as optical cameras, infrared sensors, LIDAR, RADAR, acoustic systems, and/or the like. The aerial vehicles 116, 118 may be manually and/or aerial vehicle operated. At least one of the monitoring/inspection devices 116, 118 is a large-scale aerial vehicle such as a large-scale UAV, rover, and/or the like.

A large-scale aerial vehicle may be an aerial vehicle that is capable of traversing through environmental conditions that are deemed unsafe for human personnel. Large-scale mobile aerial vehicles may have an increased size over conventional-scale mobile aerial vehicles; increased flying/roving ranges over conventional-scale aerial vehicles; increased payload capacities over conventional-scale mobile aerial vehicles; increased environmental capabilities over conventional-scale mobile aerial vehicles such that these devices may traverse in/through events having environmental conditions that conventional-scale mobile aerial vehicles are unable to traverse or are prohibited from traversing; and/or the like. In one or more embodiments, a large-scale aerial vehicle may be an aerial vehicle that exceeds one or more specifications provided in the U.S. Code of Federal Regulations for small unmanned aircraft.

In many instances, a geographical area 102 may experience natural (or man-made) events 124, 126 such as heavy winds, rain, tornados, hurricanes, fires, earthquakes, flooding, and/or the like that make it unsafe and difficult for human personnel (e.g., work crews) and/or conventional sized unmanned mobile aerial vehicles to operate within. Therefore, as will be discussed in greater detail below, embodiments may utilize one or more aerial vehicles 116, 118 such as a large-scale unmanned mobile aerial vehicle that are capable of operating in during events 124, 126 and associated environmental conditions to inspect the AOIs 108 and their utility system(s) 110. The large-scale unmanned mobile aerial vehicle may be deployed from the geographic area 102 experiencing the event 124, 126 and/or may be deployed from a remote geographical area 104, 106 that may or may not be experiencing the event (or another event).

Figure 2:
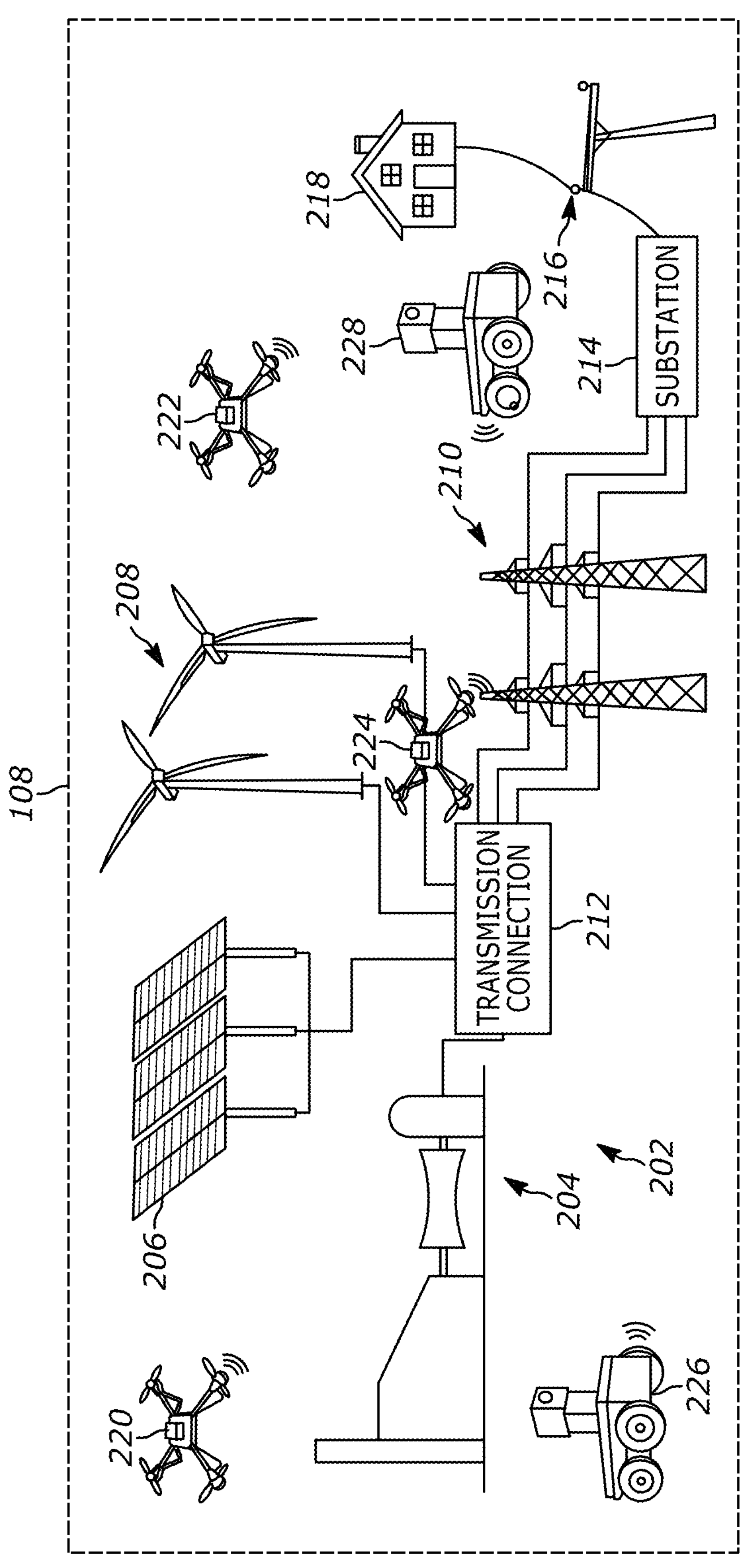
FIG. 2 is more detailed example of a system for aerial vehicle inspection/monitoring of components within areas of interest, according to one aspect of the present invention.

FIG. 2 shows a more detailed example of an AOI 108 located within a geographical area 102. In the example shown in FIG. 2, the AOI 108 includes an electrical power "grid" that is used to provide electrical power to consumer premises 218. AOI 108 may contain a multitude of individual or overlapping AOIs. The example shown in FIG. 2 depicts a number power generation components 202 for the utility system 110. Illustrated are a combined cycle gas generator 204, a solar array farm 206, and a wind farm 208 AOIs. In further examples, operational contexts are able to include one power generation component, multiple collocated power generation components, power generation components that are physically separated and supply a common electrical power transmission or distribution system, any one or more power generation components, or combinations of these. These power generation components are able to be of any suitable type or design.

In this example, electrical power generated by one or more power generation components is provided to a power transmission system 210. The illustrated example depicts a transmission connection 212 that couples one or more sources within power generation components 202 to the power transmission system 210. In an example, the transmission connection 212 and power transmission system 210 AOIs include suitable step-up transformers and long-distance transmission lines to convey the generated electrical power to remote power distribution networks, other electrical power consumers, or both.

The illustrated power transmission system 210 provides electrical power to one or more distribution systems, including a substation 214, distribution lines 216, and premises 218. The substation 214 AOI may include transformers, protection devices, and other components to provide electrical power to power distribution lines 216. The power distribution lines 216 deliver power produced by the generating components 202 to customer premises, such as the illustrated home 218. In general, customer premises are coupled to the power distribution system 210 and can include any combination of residential, commercial, or industrial buildings. FIG. 2 further shows one or more monitoring/inspection devices 220 to 228 being placed at and/or traversing one or more locations within the AOIs 108.

Aerial Vehicles

Figure 3:
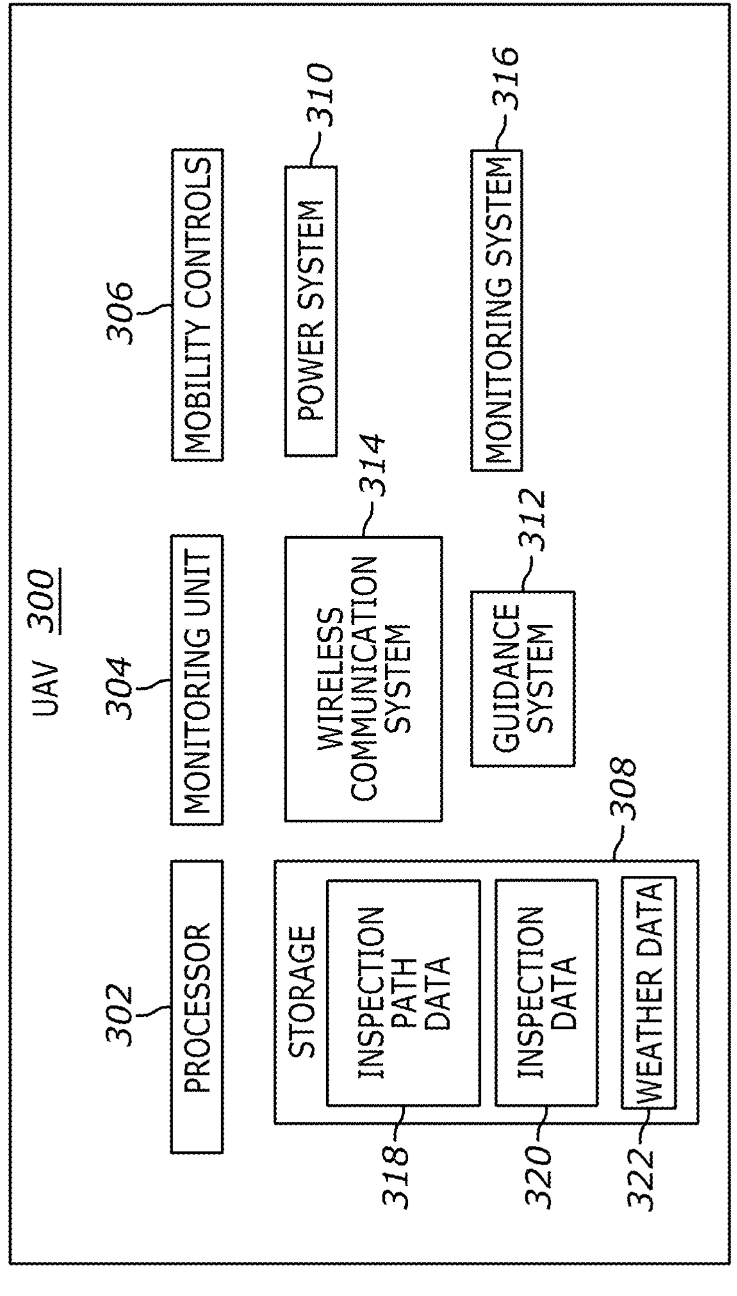
FIG. 3 is a block diagram illustrating one example of an aerial vehicle aerial vehicle, according to one aspect of the present invention.

FIG. 3 shows one non-limiting example of a large-scale aerial vehicle 300 corresponding to the aerial vehicles 116, 118 of FIG. 1. In this example, the aerial vehicle 300 comprises one or more processors 302, a monitoring unit 304, mobility controls 306, one or more storage units 308, one or more power systems 310, one or more guidance systems 312, one or more wireless communication systems 314, and a monitoring system 316. The processor(s) 302 may perform various computing functions for the aerial vehicle 300. The monitoring unit 304 may control automated mobility (e.g., flying, roving, climbing, etc.) operations of the device 300; receive data from the information processing system 112 such inspection path data and instructions indicating that the aerial vehicle 300 is to initiate mobility operations; manages monitoring/inspection operations to be performed by the device 300 for one or more system components of the AOI 108; and/or the like.

In one embodiment, the monitoring unit 304 utilizes the monitoring system 316 and computer/machine learning mechanisms to aerial vehicle identify system components; determine a current operational state of the system components; determine any problems with and/or damage to the components; monitor current weather conditions; and/or the like. The monitoring unit 304 may also control automated mobility operations of the device 300. For example, if the device 300 is a UAV the monitoring unit 304 (and/or processor 302) may aerial vehicle control the various systems and mobility controls/components that enable the aerial vehicle 300 to traverse an inspection path. The monitoring unit 304 may be part of the processor 302, is the processor 302, or is a separate processor. The monitoring unit 304 is discussed in greater detail below.

The mobility controls 306 comprise various mechanisms and components such as propellers, tracks, motors, gyroscopes, accelerometers, and/or the like that enable the aerial vehicle 300 to take flight, rove, climb, and/or the like. The mobility controls 306 are aerial vehicles managed and controlled by the monitoring unit 304 and/or processor 302. The storage unit(s) 308 includes random-access memory, cache, solid-state drives, hard drives, and/or the like. In one embodiment, the storage unit(s) 308 may comprise inspection path data 318, inspection data 320, weather data 322, and/or the like. The inspection path data 318, in some embodiments, may be received by the monitoring unit 304 from the information processing system 112 and/or is an aerial vehicle generated by the monitoring unit 304. The inspection path data 318 may include, for example, predefined and/or aerial vehicle-generated coordinates that form a path to be traversed by the aerial vehicle 300 for inspecting/monitoring one or more system components within an AOI 108. The inspection path data 318 may also include altitude data and speed data that indicate the altitude and speed at which the aerial vehicle 300 is to traverse one or more portions of the inspection path. The inspection path data 318 may further include data indicating specific angles at which the aerial vehicle 300 is to position itself relative to a given system component for capturing inspection data 320.

The inspection path data 318 may be stored at the aerial vehicle 300 and/or at the information processing system 112. In this embodiment, the monitoring unit 304 of the device 300 may receive an instruction from the information processing system 112 indicating that the device 300 is to initiate mobility operations (e.g., initiate flight, roving, climbing, etc.) along with the identifier of the inspection path to be taken. The monitoring unit 304 may analyze the inspection path data 318 to identify the inspection path corresponding to the received identifier. In another embodiment, the monitoring unit 304 aerial vehicle determines which inspection path data 318 to follow based on parameters such as day, time, expected weather, and/or the like.

The weather data 322 may comprise current weather conditions corresponding to the location of the aerial vehicle 300, current weather conditions at the AOI 108 to be inspected, expected weather conditions along the flight/roving path, expected weather conditions at the AOI 108, and/or the like. The weather data 322 may be obtained from the information processing, a remote information processing system, and/or the monitoring system 316. For example, the monitoring system 316 may comprise environmental sensors that enable weather data to be captured. In one embodiment, the weather data 322 may be stored at the aerial vehicle 300 the information processing system 112, and/or a remote information processing system.

The power system(s) 310 provides power to the aerial vehicle 300 and its components. The power system(s) 310 may include batteries, photovoltaic components, fuel, and/or the like. The guidance system 312, in one embodiment, may comprise components such as a Global Positioning System (GPS) tracking system, accelerometers, gyroscopes, magnetometers, collision avoidance components (e.g., LIDAR, RADAR, etc.), and/or the like. The GPS tracking system may be utilized to plot trajectories of the device 300 and determine the location, speed, heading, and altitude of the device 300. The accelerometer(s) may also be utilized to determine the speed of the device, while the magnetometer (s) may be utilized to determine the device's heading. The gyroscope enables the device 300 to correct its orientation with respect to the ground. The GPS tracking system may utilize one or more of the location, speed, heading, and altitude data to adjust the course of the device 300. The collision avoidance components enable the device to detect obstacles in its path and adjust its location, speed, heading, and/or altitude accordingly.

The wireless communication system 314 comprises components such as Wi-Fi based transmitters/receivers, cellular-based transmitter/receivers, etc. that enables the device 300 to send and receive secured and/or unsecured wireless communications. The wireless communication system 314 may also include wired network components that may be utilized to transmit data while the device 300 is docked at a docking station, recharging station, and/or the like. The monitoring system 316, in one embodiment, comprises one or more optical cameras, infrared sensors, LIDAR, RADAR, acoustic systems, and/or the like that capture their respective data types associated with system components within an AOI 108. The captured data is stored as inspection data 320. The monitoring system 316 may also include one or more environmental sensors that enable the measurement/detection of temperature, humidity, precipitation quantity, precipitation type, precipitation intensity, air pressure, wind speed/direction, lightning, and/or the like.

Information Processing System

Figure 4:
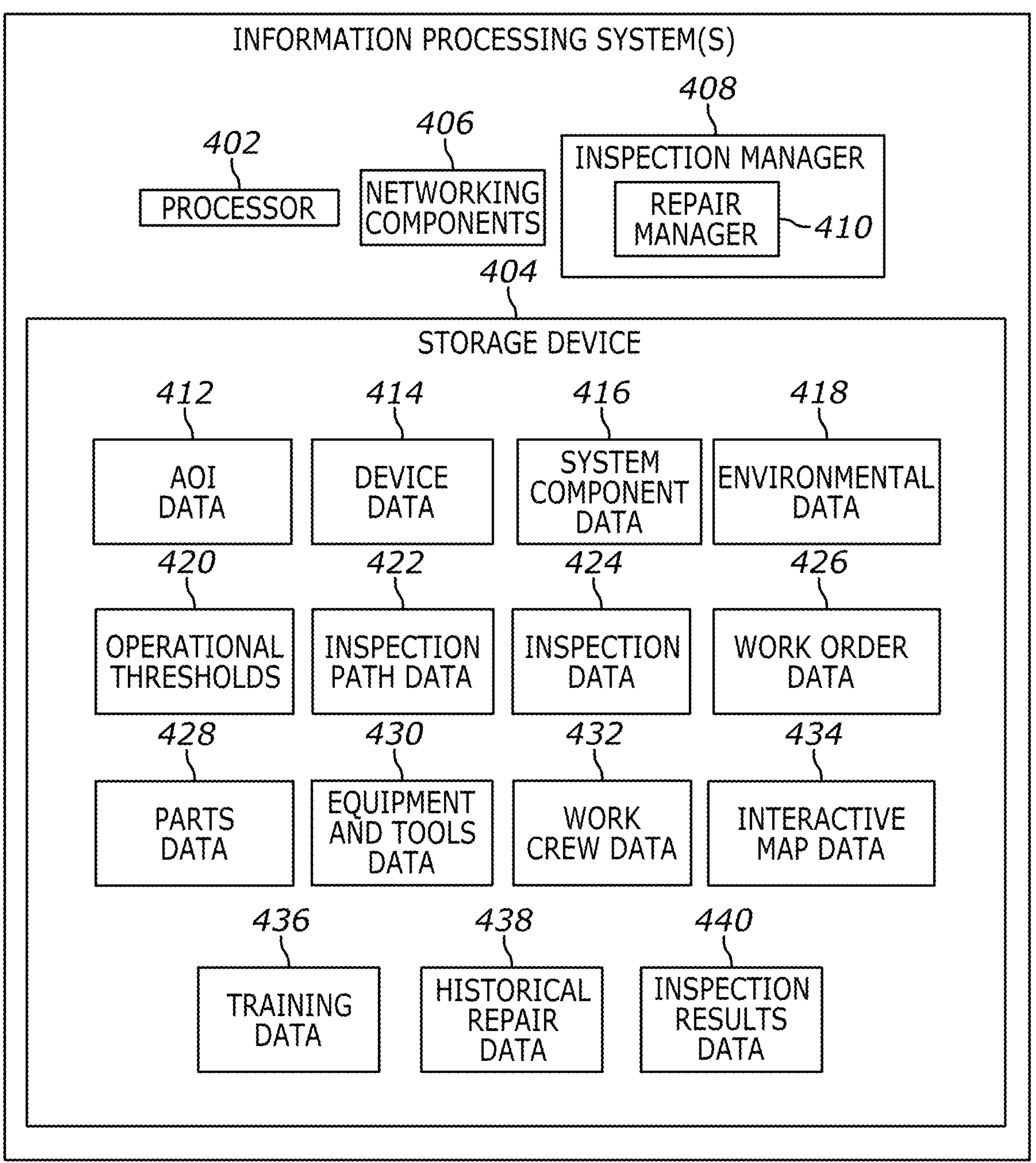
FIG. 4 is a block diagram illustrating one example of an information processing system for managing aerial vehicle inspection/monitoring of components within areas of interest, according to one aspect of the present invention.

FIG. 4 shows one non-limiting example of the information processing system 112. The information processing system 112 may include one or more processors 402; one or more storage devices 404; networking/communication components 406; and an inspection manager 408, comprising a repair manager 410. In one embodiment, the storage device (s) 404 may store various types of data such as AOI data 412, aerial vehicle data 414, utility system component data 416, environmental data 418 (e.g., weather data, event data, etc.), operational threshold data 420, inspection path data 422, inspection data 424, work order data 426, parts data 428, equipment and tool data 430, work crew data 432, interactive map data 434, training data 436, repair data 438, inspection results data 440 and/or the like. It should be noted that although FIG. 4 shows the various types of data 412 to 440 residing within the storage device(s) 404, one or more of these datasets may reside outside of the storage device(s) 404 on one or more remote information processing systems. It should also be noted that one or more of the information processing system components may be distributed across multiple information processing systems. The components of the information processing system 112 are discussed in greater detail below. In some embodiments, the inspection manager 408 performs one or more operations performed by the monitoring unit 304 of the aerial vehicles 116, 118, and vice versa.

As discussed above, geographical areas 102 comprising AOIs 108 such as utility systems 110 may experience natural (or man-made) events 124, 126 having environmental conditions such as heavy winds, rain, tornados, fires, hurricanes, and/or the like. During these events and conditions components of utility systems 110 may become damaged and inoperable. Due to Occupational Safety and Health Administration (OSHA) standards, company policies, etc. work crews may not be allowed to work outside in the AOI 108 during the events 124, 126. For example, current OHSA standards set a safety threshold of 49 mph for wind speed that prohibits work crews from working outside when the wind speed is over 49 mph. These standards may also prohibit the operation of vehicles, planes, helicopters, and/or like by humans when the environmental conditions do not satisfy the safety thresholds/policies. Therefore, damage assessment by human-based work crews is usually limited to start after an "all clear" is determined. This may be several hours or days after an event has impacted an AOI 108. This delay in damage assessment may result in increased danger to customers, decreased customer satisfaction, increased costs incurred by the utility provider, and/or the like.

Accordingly, in one or more embodiments, the inspection manager 408 selects and programs at least one monitoring/inspection device 116, 118 based on at least current and/or expected environmental conditions of a given AOI(s) 108 and one or more operational thresholds 420. In one example, the aerial vehicles 116, 118 disposed within the AOI(s) 108 and other geographical areas 104, 106 may be of different types and of different configurations. For example, some aerial vehicles may be large-scale devices while other devices may be conventional-scale mobile aerial vehicles. It should be noted that in some embodiments, one or more aerial vehicles 116, 118 may have a size that is similar to a conventional hobby or professional UAV/drone but may be configured to/capable of traversing through events 124, 126.

In one embodiment, the inspection manager 408 monitors current environmental conditions and/or expected conditions within AOIs 108 and/or surrounding geographical areas 102 to 106. The inspection manager 408 may utilize one or more sensors within the operating environment 100 and/or monitoring devise 116, 118 to obtain environmental data 418 for the AOIs 108 and/or surrounding geographical areas 102 to 106. The inspection manager 408 may also receive environmental data 418 from one or more remote information processing systems as well. The inspection manager utilizes the environmental data 418 (which may comprise current, historical, and predicted environmental data) to determine the current and/or expected environmental conditions for the AOIs 108 and/or surrounding geographical areas 102 to 106. For example, based on the obtained environmental data 418, the inspection manager 408 may determine the current/expected wind speeds; rainfall; snowfall; lightning activity; tornado activity; ground conditions such as downed trees, flooding, etc.; seismic activity; smoke particles in the air; and/or the like.

The inspection manager 408 may determine the current/expected environmental conditions based on detecting an issue with the utility system 110; may continuously or periodically monitor current/expected environmental conditions; and/or the like. In some embodiments, the inspection manager 408 determines that an AOI 108 may require an inspection based on its current and/or expected environmental conditions. Therefore, in this embodiment, the inspection manager 408 first monitors/determines the current and/or expected environmental conditions and then determines that an inspection is or may be required for the AOI(s) 108 based on the monitoring/determination. In other embodiments, the inspection manager 408 may determine that an AOI 108 may require an inspection based on a detected issue with the utility system 110, inspection schedule or another time-based schedule, a request received from a user, and/or the like. In these embodiments, the inspection manager 408 may first determine that an inspection is or will be required and then determines the current/expected environmental conditions of the AOI(s) 108 and/or surrounding geographical areas 102 to 106.

When the inspection manager 408 determines that an inspection is to be performed for components within one or more AOIs 108, the inspection manager 408 analyzes its obtained environmental condition data 418 for the AOI 108 (and optionally the surrounding geographic areas) with respect to one or more operational thresholds 420, which may include thresholds such as safety threshold, environmental condition thresholds, and/or the like. The operational thresholds 420 may be set by a governing body such as OSHA, the company performing/managing the inspection, and/or the like. In some embodiments, the operational thresholds 420 may indicate when human personnel may/not work outdoors; indicate the types and/or configurations of aerial vehicle 116, 118 that may operate during given environmental conditions; and/or the like. For example, an operational threshold 420 may indicate that human personnel are not allowed to operate outdoors when the wind speed is greater than 49 mph. In another example, an operational threshold 420 may indicate that when the wind speed is greater than 49 mph an aerial vehicle 116, 118 must have a given environmental condition rating/capability. In another example, an operational threshold 420 may specify a given wind speed, amount of rainfall or snow, and/or the like.

The inspection manager 408, in one embodiment, compares the current and/or expected environmental conditions for a given AOI 108 (and/or its surrounding geographical area) to one or more operational thresholds 420 to determine whether an aerial vehicle 116, 118 is to be used for the inspection as compared to human personnel, the type and/or configuration of aerial vehicle 116, 118 to be used, and/or the like. For example, if the inspection manager 408 determines that current and/or expected environmental conditions for a given AOI 108 (and/or its surrounding geographical area) fail to satisfy an operational threshold 420 allowing human personnel to operate within the AOI 108, the inspection manager 408 may analyze the aerial vehicle data 414 to identify and select one or more aerial vehicles 116, 118 that may operate in the current and/or expected environmental conditions.

In another example, the inspection manager 408 may determine that current and/or expected environmental conditions for a given AOI 108 (and/or its surrounding geographical area) fail to satisfy (or satisfy) an operational threshold 420 indicating a type/configuration of aerial vehicle 116, 118 that may operate within the AOI 108 during the current/expected environmental conditions. In this embodiment, the inspection manager 408 analyzes the aerial vehicle data 414 to identify and select one or more aerial vehicles 116, 118 that may operate in the current and/or expected environmental conditions. In some embodiments, the inspection manager 408 does not utilize the thresholds 420 but identifies and selects one or more aerial vehicles 116, 118 capable of operating within the current and/or expected environmental conditions.

After the inspection manager 408 determines that an aerial vehicle 116, 118 is to be utilized for performing the inspection operation based on the current and/or expected environmental conditions and/or thresholds 420, the inspection manager 408 analyzes the aerial vehicle data 414 to determine and select one or more aerial vehicles 116, 118 to perform the inspection operation(s). Aerial vehicle data 414 for a given aerial vehicle may comprise data such as (but not limited to) device type, environmental rating and/or capabilities, device payload, device flight ceiling, sensor data, power source(s), communication capabilities, mobility capabilities, operational range/time(s), and/or the like.

The inspection manager 408 may obtain aerial vehicle data for a given AOI and other geographical areas in different ways. For example, the inspection manager 408 may utilize one or more of the networking components 406 to establish a communication link with a remote information processing system(s) (not shown) via the network 114, where the communication link may be secure or unsecure. In this example, the remote information processing system stores aerial vehicle data. Upon establishing the communication link, the inspection manager 408 may download the aerial vehicle data 414 stored at the remote information processing system and then store this data as local aerial vehicle data 414 in the one or more storage devices 404. In other embodiments, the inspection manager 408 does not download the remotely stored aerial vehicle data but accesses and processes this data directly on the remote information processing system. Alternatively, the remote information processing system may push its aerial vehicle data to the inspection manager 408 at one or more predefined intervals and/or upon new aerial vehicle data being obtained by the remote information processing system.

Aerial Device Monitoring Data

FIG. 5 shows various examples of aerial vehicle data 414. In the example shown in FIG. 5, each row 502, 504, 506 in the table 500 corresponds to aerial vehicle data for a given set of aerial vehicles; an individual aerial vehicle; and/or aerial vehicle accessories such as refueling/recharging docking systems and weather protection enclosures. Each row 502, 504, 506 may be referred to herein as a "aerial vehicle profile". In this example, each column within the table 500 stores a different type of data. It should be noted that embodiments of the present invention are not limited to the types of data shown in the columns of FIG. 5. Also, one or more of the columns shown in FIG. 5 may be removed and/or additional columns having different types of data may be added. It should also be noted that aerial vehicle profiles for different aerial vehicles are not required to be stored in a single table and may be stored separate from each other.

In the example shown in FIG. 5 the table 500 comprises a first column 508 entitled "Device ID"; a second column 510 entitled "Device Type"; a third column 512 entitled "Envrn Cpblty"; a fourth column 514 entitled "Power Source(s)"; a fifth column 516 entitled "Comm"; a sixth column 518 entitled "Sensor/Feature Data", such as imaging data such as LiDAR and GeoTIFF; a seventh column 520 entitled "Mobility"; an eighth column 522 entitled "Op Features"; a ninth column 524 entitled "Loc"; a tenth column 526 entitled "Op Time"; and an eleventh column 528 entitled "Op Costs".

The "Device ID" column 508 comprises entries 530 comprise a unique identifier for the device associated with the aerial vehicle profile. It should be noted that in some embodiments, each row in the table is an aerial vehicle profile for a group of identical devices such as a given product. For example, an aerial vehicle profile may represent a given product such as a specific UAV model. In this embodiment, the identifier uniquely identifies the product as a whole. In other embodiments, an aerial vehicle profile represents an individual device where multiple identical device each of their own aerial vehicle profile. In this embodiment, the identifier uniquely identifies the individual device.

The "Device Type" column 510 comprises entries 532 indicating the device type of the aerial vehicle(s) associated with the device profile. Examples of device types include (but are not limited to) manned aerial vehicle, UAV, rover, climbing robot, camera, and/or the like. The "Envrn Cpblty" column 512 comprises entries 534 indicating the environmental rating of the device, the environmental capabilities of the device, type of environmental protection that is utilized by the device, and/or the like. This information indicates the types and/or specific conductions such as wind speed, amount of precipitation, water depth, and/or the like that the device is capable of operating in. These entries may also indicate the International Protection (IP) Marking code of the device; degree of protection against electromagnetic pulses; degree of protection against drops, bumps, and falls; and/or the like.

The "Power Source(s)" column 514 comprises entries 536 identifying the types of power sources utilized by the device and their operating characteristics. For example, a power source entry may indicate that the aerial vehicle comprises a rechargeable or disposable (non-chargeable) battery; number of batteries; whether a rechargeable may be charged using solar or non-solar mechanisms; battery chemistry; battery voltage; battery capacity; battery power; and/or the like. The "Communication" column 516 comprises entries 538 identifying the communication capabilities of the device. For example, a communication entry may indicate whether the device has wired and/or wireless communication abilities; the communication standards/networks supported by the device; security protocols implemented by the device; and/or the like.

The "Sensor/Feature Data" column 518 comprises entries 540 identifying and/or describing the sensors/features that are implemented on the aerial vehicle(s). For example, these entries may indicate whether the device(s) has a GPS system; accelerometer; a barometer; a weather sensor; an optical imaging system for capturing photographs and/or video; the type of image sensor utilized by the system (e.g., visible light sensor, infrared sensor, etc.); the resolution of the system; focal length of lens; zoom capabilities; and/or the like. The sensor data entries may also indicate if the device has a thermal sensor; ion sensor; plasma sensor; audio sensor; and/or the like, and further identify the operating capabilities of these sensors. The “Mobility” column 520 comprises entries 542 indicating the mobility capabilities of the device. For example, a mobility entry may indicate whether the device is fixed or mobile; identify a mobility modality such as flight, ground traversal, climbing, and/or the like; if the device is a camera whether it can be panned and/or tilted; and/or the like.

The “Operating Features” column 522 comprises entries 544 indicating specific features of the device. For example, an operating feature entry may identify the roving, flight, or climbing speed of the device; the number of wheels or propellers; the altitude limit of the device; whether the device has a return to base feature when batter levels are low; and/or the like. The “Loc” column 524 comprises entries 546 indicating the location of the associated aerial vehicle. The location may be indicated by longitude and latitude coordinates, the ID of the AOI if the device is located within an AOI, and/or the like. The “Op Time/Range” column 526 comprises entries 548 indicating the operating time and/or range of each device of the device before recharging or refueling is needed. The “Op Costs” column 528 comprises entries 550 indicating the costs associated with operating the device. For example, these entries may indicate the purchase cost of the device; prices for replacement parts; average cost to operate the device on a daily, monthly, and/or yearly basis; and/or the like. The average operating cost may take into consideration factors such as expected repairs or parts replacement, fuel or electricity costs, and/or the like.

As discussed above, the inspection manager 408 analyzes the aerial vehicle data 414 to determine and select one or more aerial vehicles 116, 118 to perform the inspection operation(s) based on the current/expected environmental conditions for a given AOI 108 (and optionally its surrounding geographic areas) and, in some embodiments, the thresholds 420. For example, the inspection manager 408 may determine that the current and/or expected environmental conditions for an AOI 108 are wind speeds over 49 mph with precipitation of 1 inch/hr. Therefore, the inspection manager 408 analyzes the aerial vehicle data 414 to determine a aerial vehicle(s) 116, 118 comprising environmental capabilities/ratings that satisfy these conditions.

For example, the inspection manager 408 analyzes information within the aerial vehicle data 414 such as device type 510, environmental capabilities/ratings 512, sensor/feature data 518, mobility 520, operational features 522, location, 524, operational time 526, and/or the like to identify one or more inspection devices 116, 118 for selection. Information such as environmental capabilities/ratings 512 may be utilized by the inspection manager 408 to determine whether the associated aerial vehicle 116, 118 is capable and/or allowed to operate within the current/expected environmental conditions of the AOI(s) 108 to be inspected. Information such as device type 510, sensor/feature data 518, mobility 520, and operational features 522 may be utilized by the inspection manager 408 to identify aerial vehicles 116, 118 that are capable of performing the type of inspection operation(s) being requested. For example, the requested inspection operation(s) may require a device that can fly where some of the aerial vehicles may be only ground based. Information such as location 524 and operational time 526 may be utilized by the inspection manager 408 to, for example, identify devices that are capable of travelling from their base location to the AOI 108 (and optionally back to the base location) without refueling or recharging; identify devices that may be located in a geographical area not experiencing the event 124, 126 at the AOI 108 or at least has better environment conditions than the AOI 108; and/or the like.

In addition to the aerial vehicle data 414, the inspection manager 408 may also utilize AOI data 412 when determining an aerial vehicle(s) 116, 118 to select and program for the inspection operations. AOI data 412 may comprise data such as (but not limited to) the geographical type of the AOI, geographical features within the AOI, geographical size or boundaries of the AOI, elevation of the AOI, historical weather of the AOI, local and/or migratory wildlife data for the AOI, and/or the like. The inspection manager 408 may obtain AOI data 412 for a given AOI 108 in different ways such as those discussed above with respect to the aerial vehicle data 414. In some embodiments, the AOI data 412 obtained from remote information processing system may comprise data for all AOIs associated with one or more entities (e.g., utility providers) utilizing the inspection manager 408. In other embodiments, the inspection manager 408 may obtain the remote AOI data on an as needed basis. For example, when the inspection manager 408 determines an AOI 108 requires inspection operations the inspection manager 408 may obtain AOI data for the specific AOI 108 (and possibly related AOIs as well).

FIG. 6 shows various examples of AOI data 412. In the example shown in FIG. 6, each row 602, 604, 606 in the table 600 corresponds to AOI data for a given AOI and is referred to herein as an “AOI profile”. In this example, each column within the table 600 stores a different type of data. It should be noted that embodiments of the present invention are not limited to the types of data shown in the columns of FIG. 6. Also, one or more of the columns shown in FIG. 6 may be removed and/or additional columns having different types of data may be added. It should also be noted that AOI profiles for different AOIs are not required to be stored in a single table and may be stored separate from each other.

In the example shown in FIG. 6 the table 600 comprises a first column 608 entitled “AOI ID”; a second column 610 entitled “Location”; a third column 612 entitled “Size”; a fourth column 614 entitled “Terrain Type”; a fifth column 616 entitled “Elevation”; a sixth column 618 entitled “Features”; and a seventh column 620 entitled “Historical Weather”. The “AOI ID” column 608 comprises entries 622 such as a unique identifier that uniquely identifying each AOI and its profile in the table 600. The “Location” column 610 comprises entries 624 with data identifying the location of the AOI associated with the AOI profile. One example of location data includes a range of longitude and latitude coordinates defining the area encompassed by the AOI. The “Size” 612 column comprises entries 626 indicating the geographical size of the AOI. The “Terrain Type” column 614 comprises entries 628 indicating the type of terrain associated with AOI. For example, the entries may indicate the terrain type as “Hill”, “Desert”, “Mountain”, “Open”, etc. The “Elevation” column 616 comprises entries 630 indicating the elevation of the AOI.

The “Features” column 618 comprises entries 632 identifying geographical features and (optionally) their locations within the AOI. For example, a feature entry under this column may indicate the AOI has a river/stream, mountain, cluster of trees, boulders, and/or the like at specific locations within the AOI. In another example, a feature entry may indicate that the ground within the AOI is comprised of gravel, grass, cement, and/or the like. The “Historical Weather” column 620 comprises entries 634 having historical weather data such as weather patterns for the AOI. For example, the entries under this column may indicate the daily, weekly, monthly, and/or yearly average temperatures, humidity levels, wind speeds, rainfall, snowfall, UV levels, and/or the like.

The inspection manager 408 may utilize the AOI data 412 to determine for example, determine the location and size of the AOI 108 to be inspected, various geographical features of the AOI 108 to be inspected, and/or the like. The AOI data (and other AOI data) may then be used by the inspection manager 408 when determining one or more aerial vehicles 116, 118 to select and program for the inspection operation. For example, based on the AOI data 412 and the aerial vehicle data 414, the inspection manager 408 is able to determine the distance each of the aerial vehicles 116, 118 within the operating environment 100 and the AOI 108 to be inspected; the type of terrain the aerial vehicle 116, 118 has to traverse; and/or the like.

Accordingly, in some embodiments, the inspection manager 408 not only utilize the aerial vehicle data 414 to determine aerial vehicles 116, 118 that are capable of operating within the current/expected environmental conditions of the AOI 108 (and/or surrounding geographical areas) but further utilize the aerial vehicle data 414 in combination with the AOI data 412 to determine aerial vehicles 116, 118 that are also capable of operating according to various AOI attributes such as distance, terrain etc. For example, the inspection manager 408 may analyze the location data 524 and operating time data 526 of the aerial vehicles 116, 118 in combination with the location data 610 of the AOI 108 to be inspected to determine a aerial vehicle that is able to traverse at least the distance between its base location to the AOI 108 without refueling/recharging.

Based on the operations discussed above, the inspection manager 408 selects one or more aerial vehicles 116, 118 to perform the inspection operation(s). The inspection manager 408 may select an aerial vehicle within the AOI 108 and/or outside of the AOI 108. For example, the AOI 108 may include an aerial vehicle that satisfies the operational thresholds 420, environmental capabilities, etc. In another example, the inspection manager 408 may select an aerial vehicle 116, 118 from a location that is remote from the AOI 108 and not experiencing the event 124, 126 and environmental conditions of the AOI 108.

Once selected the aerial vehicles 116, 118 may be programmed by the inspection manager 408 to perform the requested inspection operation(s). For example, the inspection manager 408 may program the selected aerial vehicles 116, 118 with one or more inspection paths for performing inspection operations with respect to system components within the AOI 108. In other embodiments, the monitoring unit 304 of the aerial vehicle 116, 118 may program the aerial vehicle with one or more inspection paths. The inspection paths may be predefined and/or may be aerial vehicle generated by the inspection manager 408. The inspection paths may be stored within the storage device(s) 404 of the information processing system 112 as inspection path data 422. In an embodiment where the inspection manager 408 aerial vehicle generates the inspection paths, the inspection manager 408 analyzes the AOI data 412, aerial vehicle data 414, and utility system component data 416 to determine a given inspection path for a given aerial vehicle 104 to perform inspection operations for one or more system component(s).

The utility system component data 416 may comprise data such as (but not limited to) a unique identifier of the component; part number of the component; location of the component; function of the component; configuration data; and/or the like. The inspection manager 408 may obtain system component data 416 for a given AOI 108 utilizing methods similar to those discussed above with respect to the AOI data 412 and the aerial vehicle data 414. FIG. 7 shows various examples of system component data 416. In the example shown in FIG. 7, each row 702, 704, 706 in the table 700 corresponds to system component data for system components located within AOIs and is referred to herein as an "system component profile". In this example, each column within the table 700 stores a different type of data. It should be noted that embodiments of the present invention are not limited to the types of data shown in the columns of FIG. 7, and one or more columns shown in FIG. 7 may be removed and/or additional columns having different types of data may be added. It should also be noted that system component profiles for different system components are not required to be stored in a single table and may be stored separate from each other. In some embodiments, the system component data 716 may be part of the AOI data 412.

In the example shown in FIG. 7 the table 700 comprises a first column 708 entitled "Component ID"; a second column 710 entitled "Component Type"; a third column 710 entitled "AOI"; a third column 714 entitled "Part Number"; a fourth column 716 entitled "Location"; and a fifth column 718 entitled "Function". The "Component ID" column 608 comprises entries 720 that include a unique identifier for the component associated with the system component profile. The identifier may be a serial number or any other identifier that uniquely identifies the system component. The "Component Type" column 610 comprises entries 622 indicating the type of system component (e.g., transformer, solar panel, wind turbine, etc.) associated profile. The "AOI" column 712 comprises entries 724 with data identifying the AOI where the given system component location resides. The AOI entries may comprise a pointer to the corresponding AOI profile within the AOI data 710 and/or a unique identifier of the AOI. In some embodiments, an AOI profile for a given AOI may comprise an entry having the unique identifiers of the system components residing within the AOI and/or pointers to the corresponding system component profiles.

The "Part Number" column 714 comprises entries 726 indicating the part number/model of the system component. The "Location" column 716 comprises entries 728 identifying the location of the system component within the AOI. For example, location entries may comprise latitude/longitude coordinates of the component; altitude data; and/or the like. The "Function" column 718 comprises entries 730 identifying/describing the functions and features of the component.

When the inspection manager 408 determines an aerial vehicle 116, 118 requires inspection path data 422 based on, for example, the selection process discussed above, the inspection manager 408 utilizes one or more of the AOI data 412, aerial vehicle data 414, and utility system component data 416 to determine a given inspection path for a given aerial vehicle 116, 118. The inspection manager 408 may analyze the AOI data 412, the aerial vehicle data 414, and/or the utility system component data 416 to determine information such as the location of the device 116, 118; the location of the AOI 108 to be inspected; geographical features of the AOI; the device's operational capabilities (e.g., range, battery life, mobility capabilities, inspection capabilities, etc.); the system components within the AOI 108; the location of the components within the AOI; system component configuration; and/or the like. The inspection manager 408 analyzes the obtained data and aerial vehicle generates one or more inspection paths for the aerial vehicle 116, 118 and stores the path as inspection path data 422.

For example, the inspection manager 408 may determine that the inspection/aerial vehicle 116 is a UAV located at position P_1 and is to inspect system component located at P_N within the AOI 108 and having a height of H_1. The inspection manager 408 may further determine that aerial vehicle 116 has flight capabilities, a battery capacity of C, and an operational range of R. The inspection manager 408 also determines that the AOI comprises a cluster of trees near the system component at position P_2. Even further, the AOI 108 and/or one or more geographical areas between the AOI 108 and the aerial vehicle 116 may be experiencing one or more of the events 124, 126.

Taking this data into consideration, the inspection manager 408 aerial vehicle generates one or more flight paths for the aerial vehicle such that the device avoids the cluster of trees and is able to perform one or more inspection operations with respect to the system component while being able to return to its home base (or at least a recharging station) prior to depleting its power/energy source(s). The one or more flight paths may also be generated such that the aerial vehicle 116 avoids any events 124, 126 (or at least minimizes interaction with the events) between the home base of the monitoring 116 device and the AOI 108. The inspection manager 408 may utilize one or more machine learning mechanisms for generating an inspection path. A discussion on machine learning mechanisms is provided in greater detail below. In some embodiments, the monitoring unit 304 may perform the operations discussed herein with respect to selecting and/or aerial vehicle generating an inspection path for its aerial vehicle 116 to traverse. It should be noted that, in some embodiments, the monitoring unit 304 of an aerial vehicle 116 may perform the operations discussed above with respect to the inspection paths.

Once the inspection manager 348 has selected and/or generated an inspection path for a given aerial vehicle 116, the inspection manager 408 stores the path as inspection path data 422. FIG. 8 shows various examples of inspection path data represented as a table 800. In the example shown in FIG. 8, each row 802 to 808 in the table 800 corresponds to an inspection path. It should be noted that in other embodiments, each inspection path 802 to 808 is stored separate from one another. The table 800 comprises a plurality of columns, each storing a different set of information. In this example, the table 800 comprises a first column 810 entitled "Inspection Path ID"; a second column 812 entitled "Device ID"; a third column 814 entitled "Coordinate Data"; a fourth column 816 entitled "Altitude Data"; a fifth column 818 entitled "Speed Data"; a sixth column 820 entitled "Temporal Data"; and a seventh column 822 entitled "Inspection Angle(s)". It should be noted that the inspection path data 422 is not limited to the items shown in FIG. 8 as one or columns may be removed, or additional columns added.

The "Inspection Path ID" column 810 comprises entries 824 uniquely identifying each inspection path in the inspection path data. The "Device ID" column 812 comprises entries 826 identifying the aerial vehicle 116, 118 associated with the inspection path. The entries 826 may include the unique ID associated with the aerial vehicle; a pointer to the aerial vehicle profile associated with the device; and/or the like. The "Coordinate Data" column 814 comprises entries 828 with coordinate data, which may be in three-dimensional space, defining a path and pattern to be traversed. Two or more of the inspection paths may have different traversal patterns or all inspection paths may have the same traversal pattern. In one embodiment, the coordinates of an inspection path are defined such that the aerial vehicle avoids colliding with any of the system components, other aerial vehicles, minimizes interaction with inclement weather, etc. In addition, two or more inspection paths may have coordinates that overlap with each other.

The "Altitude Data" column 816 comprises entries 830 having altitude data for the corresponding inspection path. For example, the altitude data may define a given altitude an aerial vehicle 116 is to fly at while traversing the corresponding inspection path. In some embodiments, the altitude data may include different altitudes for different portions of the inspection path. The different altitudes may be time-based and/or coordinate-based. The "Speed Data" column 818 comprises entries 832 having speed data for the corresponding inspection path. For example, the speed data may define a given speed the aerial vehicle 116 is to fly, rove, climb, and/or the like while traversing the inspection path. In some embodiments, the speed data may include different speeds for different portions of the inspection path. The different speeds may be time-based, altitude-based, and/or coordinate-based. The inspection path data 422 may also comprise additional information such as the time/day the aerial vehicle is to initiate traversal of an inspection path, time/day the aerial vehicle is to utilize the inspection path. For example, an aerial vehicle may be assigned different inspection paths based for different periods of time, expected weather patterns, and/or the like.

The "Temporal Data" column 820 comprises entries 834 indicating at when the device is to traverse the flight path. For example, these entries may identify one or more days, one or more times, and/or the like that the device is to traverse the associated flight path. The "Inspection Angle (s)" column 822 comprises entries 836 indicating one or more angles at which a aerial vehicle 104 is to position itself relative to a given system component for capturing inspection data 424. It should be noted that the inspection path data may be dynamically updated by the inspection manager 408 and/or monitoring unit 304 as the aerial vehicle 116 is traversing the path. The inspection path data may also be updated while the aerial vehicle 116 is docked at a docking station or a refueling/recharging station.

In one embodiment, the inspection manager 408 establishes a communication link with the selected aerial vehicle (s) 116, 118 and transmits the inspection path(s) to the device 116, 118. The aerial vehicle(s) 116, 118 stores the inspection path within a storage unit 308 as inspection path data 318. When the monitoring unit 304 of the monitoring deice 116, 118 determines that inspection operations are to be performed, the monitoring unit 304 initiates traversal of one or more inspection paths based on the inspection path data 318. For example, the monitoring unit 304 may receive a signal from the information processing system 112 instructing the monitoring unit 304 to perform the inspection operations. In another example, the monitoring unit 304 may have previously received data from the information processing system 112 identifying the day and times the aerial vehicle 104 is to perform inspection operations with respect to system components. This data may be transmitted by the information processing system 112 as part of inspection path data, separate from the inspection path data, and/or the like.

In another embodiment, the monitoring unit 304 may dynamically determine when an inspection should be performed. For example, the monitoring unit 304 may utilize one or more sensors within the monitoring system 316 or receive environmental data 418 from the information processing system (or another system) to determine, for example, that inclement weather or other environmental conditions are approaching, occurring, and/or has occurred within an AOI 108. Upon a determination that inclement environmental conditions are approaching or expected, the monitoring unit 304 may aerial vehicle operate the device 116, 118 to perform an inspection to establish an operational state of the system component prior to the inclement weather. When the monitoring unit 304 determines the inclement weather has passed or if the aerial vehicle 116, 118 determines (similar to the process utilized by the inspection manager 408) that it has the capability to operate in the detected/expected environmental conditions, the monitoring unit 304 may aerial vehicle operate the aerial vehicle 116, 118 to perform an inspection of the system component. The inspection data captured prior to the inclement weather may be compared against the inspection data captured after the inclement weather to determine any changes in the operational state of the system component. In some embodiments, the inspection manager 408 may perform the above operations as well.

As the selecting aerial vehicle(s) 116, 118 traverses an inspection path(s), the device 116, 118 performs inspection operations with respect to one or more system components within an AOI. The aerial vehicle 116, 118 utilizes its monitoring system 316 to perform the inspection operations. In some embodiment, the aerial vehicle 116, 118 performs the inspection operations during the event(s) 124, 126. As discussed above, the monitoring system 316 comprises one or more optical cameras, infrared sensors, LIDAR, RADAR, acoustic systems, and/or the like that capture their respective data types associated with system components. As the system component(s) comes into range of the monitoring system 316, the monitoring system 316 captures and records inspection data 320 associated with the system component. For example, the monitoring system 316 captures still images/frames or a video of the system component; audio associated with the system component; temperature measurements for the system component; gas level measurements for the system component; and/or the like. The monitoring system 316 may also continuously capture inspection data 320 and not just when the system components come into range of the monitoring system 316.

The monitoring unit 304 may store the captured data locally as inspection data 320 and/or transmit the data to the inspection manager 408 at the information processing system 112. The data may also be transmitted to one or more user devices. The inspection manager 408 may store the received data as inspection data 424. The inspection data 424 may be transmitted to the monitoring unit 304 and/or the user devices at one or more predefined intervals of time. In addition, the inspection data 424 may be transmitted/streamed to the monitoring unit 304 and/or the user devices in real time. The information processing system 112 and/or the user device may then present the inspection data to a user upon receiving the inspection data; at one or more intervals of time; upon request by a user; and/or the like.

After the inspection manager 408 of the information processing system 112 has received inspection data 424 from an aerial vehicle(s) 116, 118, the inspection manager 408 processes the data to determine a current operational state of system components, determine whether system components are damaged or non-functioning, and/or the like. It should be noted that, at least in some embodiments, determining an operational state of a system component may encompass multiple operations such as determining if the component is operational; non-operational, operating normally (e.g., within expected parameters/thresholds); operating abnormally (e.g., outside expected parameters/thresholds; determining that the component has been damaged, the type of damage, the parts of the component that have been damaged, the location of the damage, the cause of the damage, etc.; determining that the component is being obstructed by debris, the type of debris, the location of the debris, etc.; and/or the like. It should be noted that the monitoring unit 304 of an aerial vehicle 116, 118 may also be configured to perform these operations as well.

In one embodiment, the inspection manager 408 utilizes one or more machine-learning mechanisms to determine the operational state of the system component, any damaged associated with the component, and/or the like. For example, the inspection manager 408 may utilize a deep learning artificial neural network (DLANN) model trained to recognize system components, determine damage to the system components, determine the type of damage, anticipate damage and/or abnormal operation conditions based on expected weather, and/or the like. It should be noted that other machine learning models and algorithms are applicable as well.

A DLANN model is generally comprised of a plurality of connected units referred to as artificial neurons. Each unit is able to transmit a signal to another unit via a connection there between. A unit that receives a signal from another unit processes the signal and may transmit its own signal to another unit based on the processed signal. A unit may be associated with a state (e.g., $0 \leq x \leq 1$) where both a unit and a connection may be associated with a weight that affects the strength of the signal transmitted to another unit. The weight may vary during the learning process of the model. The model may comprise multiple layers of connected units, where different layers perform different transformations on their inputs. The first layer acts as the initial input (e.g., from the inputted data) to the model, where signals from this layer propagate to the final layer (e.g., identified solution). The initial layers of the model may detect specific characteristics of the target solution while inner layers may detect more abstract characteristics based on the output of the initial layers. The final layers may then perform more a complex detection based on the output inner layers to detect the target solution.

The DLANN model utilized by the inspection manager 408, in one embodiment, is trained by providing training data 436 to the model as an input. The model may be trained at the inspection manager 408 and/or at an external information processing system. In one embodiment, the training data 436 comprises different images of a target object such as a system component, a system component in a normal operating state, a system component in an abnormal operating state (e.g., operating outside of normal parameters/thresholds), one or more damaged portions of a system component, obstructions and/or debris interfering with the system component, and/or the like. In one non-limiting example, an AOI 108 comprises one or more transformers to be monitored/inspected. In this example, the training data 436 comprises different images of a transformer in a normal operating state, a transformer in an abnormal operation state, a transformer with one or more portions being damaged, a transformer with trees or tree limbs interfering with the transformer, and/or the like.

In some embodiments, images comprising the target object(s) (e.g., normal operating transformer, abnormal operating transformer, components of transformer having damage, specific types of debris interfering with transformer components, etc.) to be detected by the inspection manager 408 may be annotated with text and/or a bounding box using specific software. It should be noted that other images of target objects not associated with the environment may be used as training data as well. It should be also noted that embodiments of the present invention are not limited to the environments and/or target objects discussed herein.

In some embodiments, the model comprises a convolution layer where a sliding window is passed over each of the training images where each portion of the training image is saved as a separate image. Each of these separate images for each original training file is then fed into the model as training data. The result of this training step is an array that maps out which parts of the original image have a possible target object or part of a target object. Max pooling can then be used to down sample the array. The reduced array may then be used as input into another artificial neural network and the above processes can be repeated. The final artificial neural network (e.g., fully connected network) determines whether a given image comprises a target object and, if so, which portion(s) of the image comprises the target object. It should be noted that the DLANN model may comprise multiple convolution, max-pooling, and full-connected layers. In addition, the trained DLANN model is able to tolerate shadows, variable image backgrounds, exposure settings, and changing scene lighting, etc. A similar training process may be utilized for other types of data such as audio, sensor readings, and/or the like.

Once the object detection model has been trained, the inspection manager 408 implements the model as an object detector. For example, the inspection manager 408 is programmed to detect one or more specific target objects such as a normal operating solar panel, an abnormal operating solar panel, specific components of the solar panel having damage, specific types of debris interfering with solar panel components, etc. from inspection data 424 (e.g., captured images, audio, sensor data, etc.) captured by the aerial vehicle 116, 118 utilizing the object detector.

For example, as an aerial vehicle 116, 118 is traversing an inspection path its monitoring system 316 captures inspection data 320 such as (images, audio, sensor readings, location/position/time of device at which the data was captured, etc.) of the AOI 108. In some embodiments, the monitoring system 316 continuously captures inspection data 320 while it is operating or traversing an inspection path. In other embodiments, the monitoring system 316 may be programmed with location data (e.g., coordinates) of specific system components to be inspected. In this embodiment, the monitoring unit 304 utilizes the guidance system 312 to determine when the device 116, 118 is within a threshold distance from the location of the system component(s) and activates the monitoring system 316.

The monitoring unit 304 transmits its captured inspection data 320 to the information processing system(s) 112, as discussed above. The inspection manager 408 stores this data as local inspection data 424. It should be noted that inspection data 320 captured by an aerial vehicle 116, 118 may be stored on a different information processing system (s) and accessed thereon by the inspection manager 408. The inspection manager 408 processes/analyzes the inspection data 424 to determine if the received inspection data comprises a system component such as transmission lines. If the inspection manager 408 determines that the inspection data comprises or corresponds to a system component to be inspected the inspection manager 408 determines a current operational state of the system component based on the inspection data.

For example, if the inspection data 424 comprises images the inspection manager 408 processes these images utilizing its trained object detector to determine if any of the images comprising the system component show the component having any damage or debris. If not, the inspection manager 408 may determine the system component's operational state is normal. However, if the inspection manager 408 determines the system component has been damaged or that debris is interfering with the system component the inspection manager 408 may determine that operational state of the system component is abnormal.

In some instances, the inspection manager 408 may be unable to determine a current operational state of the system component from the inspection data due to the angle at which the aerial vehicle captured an image. In one embodiment, the inspection manager 408 may communicate with the aerial vehicle 116, 118 and instruct the device to capture an image from one or more different angles. The inspection manager 408 may provide specific angles to the aerial vehicle and/or the monitoring unit 304 of the device may determine additional angles at which to capture the data. In another embodiment, the inspection manager 408 may select and instruct one or more different aerial vehicles to perform the additional inspection operations. For example, a different aerial vehicle may be able to provide images from a different angle, provide different types of data, and/or the like.

In some embodiments, the inspection data 424 comprises data in addition to (or in lieu of) images. For example, the inspection data 424 may include audio data, sensor reading data, and/or the like. As discussed above, the object detector of the inspection manager 408 may also be trained utilizing this type of data as well. Therefore, the inspection manager 408 may also utilize this type of data to detect when a system component has been damaged and/or obstructed; the type of damage and/or obstruction; the location and/or part of the system component that has been damaged and/or obstructed; and/or the like based not only on image data but also audio data, sensor reading data and/or the like. The inspection manager 408 may utilize one or more types of data to detect a current operating condition of a system component and may utilize one or more other types of data to perform a more granular analysis of the system component when damage or an abnormal operating condition has been detected.

For example, when damage or an abnormal operating condition has been detected utilizing a first type of inspection data a second type of inspection data may be utilized to determine the type damage type, the location of the damage and/or the like. It should be noted that when a first set of inspection data comprising one or more inspection data types is utilized to detect a normal operating condition; abnormal operating condition; damage type and/or the like the inspection manager 408 may utilize a second inspection dataset comprising one or more different inspection data types to confirm these detections/determinations. It should be noted that the monitoring unit 304 of one or more aerial vehicles 116, 118 may perform the operations of the inspection manager 408 discussed above. For example, the monitoring unit 304 may utilize one or more computer learning mechanisms similar to the inspection manager 408 to perform the inspection operations discussed above.

In some embodiments, the inspection manager 408 stores results of processing the inspection data 424 as inspection results data 440. The results may be used to further train the machine learning components of the inspection manager 408. FIG. 9 shows various examples of inspection results data represented as a table 900. In the example shown in FIG. 9, each row 902 to 906 in the table 900 corresponds to an inspection results for a given system component. It should be noted that in other embodiments, each inspection path 902 to 906 is stored separate from one another. It should also be noted that the inspection results data may be stored as part of other data such as system component data 416, inspection data 424, and/or the like. In addition, a given system component may have multiple entries within the table 900. The table 900 comprises a plurality of columns, each storing a different set of information. In this example, the table 900 comprises a first column 908 entitled "Component ID"; a second column 910 entitled "AOI"; a third column 912 entitled "Location"; a fourth column 914 entitled "Op State"; a fifth column 916 entitled "Damage Type"; a sixth column 918; entitled "Damaged Part"; a seventh column 920 entitled "Time"; and an eight column 922 entitled "Weather". It should be noted that the inspection results data 440 is not limited to the items shown in FIG. 9 as one or columns may be removed, or additional columns added.

The "Component ID" column 908 comprises entries 924 that include a unique identifier for the component associated with the inspection results data. The identifier may be a serial number or any other identifier that uniquely identifies the system component and/or may be a pointer to the system component profile associated with the system component. The "AOI" column 910 comprises entries 926 with data identifying the AOI where the given system component location resides. The AOI entries may comprise a pointer to the corresponding AOI profile within the AOI data 412 and/or a unique identifier of the AOI. In some embodiments, an AOI profile for a given AOI may comprise an entry having the unique identifiers of the system components residing within the AOI and/or pointers to the corresponding system component profiles.

The "Location" column 912 comprises entries 928 identifying the location of the system component within the AOI. For example, these entries may comprise latitude/longitude coordinates of the component; altitude data; and/or the like. The "Op State" column 914 comprises entries 930 identifying the current operational state of the system component as determined by the inspection manager 316 as a result of processing the inspection data 320. For example, these entries may indicate that the system component is operating normal is operating abnormally, is non-operational, is currently being obstructed by and/or interfered with debris, and/or the like. The "Damage Type" column 916 comprises entries 932 indicating the type of damage (if any) experienced by the system component. For example, these entries may indicate that a transformer has exploded; a transmission line has become decoupled; a solar panel has hail damage; and/or the like. The "Damaged Part" column 918 comprises entries 934 indicating specific part or parts of the system component that has been damaged. The "Time" column 920 comprises entries 936 indicating the time at which the inspection was performed. The "Weather" column 922 comprises entries 938 indicating the weather at the time of inspection. The weather data may be utilized as historical weather data for the inspection manager 408 when predicting potential damage to system components upon determining similar weather is expected in the future.

When the inspection manager 408 detects that a system component is experiencing a problem (e.g., a non-operational state, abnormal operational state, has been damaged, has been obstructed and/or the like) the repair manager 410 may aerial vehicle generate a work/repair order for the system component. In one embodiment, a work order may identify the system component to be repaired/replaced; identifies the location of the system component, identifies the problem associated with the system component; identifies the cause of problem; identifies the parts required to repair or replace the system component; identifies the work crew(s) to perform the repair; includes repair/replacement instructions; identifies current and/or expected weather at the location; and/or the like.

In one embodiment, the repair manager 410 may utilize one or more machine/computer learning mechanisms for aerial vehicle generating a work order. Examples of machine/computer learning mechanisms include supervised learning, unsupervised learning, reinforcement learning, and/or the like. In some embodiments, the repair manager 410 implements an artificial neural network (ANN) similar to the discussed above with respect to the inspection manager 408. However, instead of detecting objects within images the repair manager 410 generates work orders based on the inspection results data 440. Work orders generated by the repair manager 410 may be used to further train the machine learning components of the inspection manager 408 and/or the repair manager 410.

The machine/computer learning components of the repair manager 410 may be trained utilizing historical repair data 438, repair manuals for system components, previously generated work orders, and/or the like. The historical repair data 438 may comprise data associated with a plurality of repair/replacement events. Each of these events is associated with a given system component and comprises data such as such as an identification of system component that was previously repaired; the type of damage that was repaired for the component; an identification and description of the parts, tools, and their quantities used to repair the damage; procedures taken to repair the component; time taken to repair the component; the cause of the damage; the weather conditions at the time of damage detection and at the time of repair; work crew identification; work crew details such as identifiers of crew members, crew member qualifications, etc.; and/or the like. In some embodiments, the historical repair data 438 may comprise works order data 426 from work orders previously generated by the repair manager 410 and/or any other entity.

After the machine/computer learning components of the repair manager 410 have been trained, the repair manager 410 is able to aerial vehicle generate work orders for damaged/obstructed system components. The repair manager 410 may store the work orders as work order data 426. For example, the repair manager 410 takes as input and processes the inspection results data 440. If the repair manager 410 determines from the inspection results data 440 that a system component is experiencing a problem, the repair manager 410 initiates one or more aerial vehicle work order generation processes.

Consider the example of inspection results data shown in FIG. 9. Upon processing this data, the repair manager 410 determines the component having the ID of CID_2 is experiencing a problem based on one or more of the Operational State entry, Damage Type entry, or the Damaged Part entry. The repair manager 410 processes the system component data 416 to identify a profile comprising a component ID matching the component ID identified within the inspection results data 440. In this example, the repair manager 410 determines that the system component experiencing a problem is a Type_B system component (e.g., a transformer). It should be noted that the component type information may also be included within the inspection results data 424.

The repair manager 410 may then aerial vehicle generate a work order for the transformer utilizing one or more of its machine learning components and stores this as work order data 426. For example, based on the system components and its attributes (e.g., type, location, configuration, etc.); damage and its attributes (e.g., type, location, cause, etc.); the specific parts of the system component that have been damaged; type of debris obstructing the system component and/or surrounding areas; and/or the like the repair manager 410 determines the parts; tools; equipment; vehicles; work crew type; specific work crew member; and/or the like required for repairing the transformer.

In some embodiments, the inspection results data 440 may not explicitly identify damaged parts of a system component but may identify the cause of damage. For example, the type of damage may indicate that the transformer was struck by lightning. Therefore, the repair manager 410 may determine the parts that were most likely to be damaged by this event. Alternatively, the inspection results data 440 may explicitly identify the damaged parts. Based on the determination of these parts, the repair manager 410 is able to determine the tools and procedures for repairing or replacing these parts based on its machine learning components.

As discussed above, not only does the repair manager 410 determine the parts and tools required to repair system components but also determines the vehicles, equipment, and work crews required to repair the system component. For example, the repair manager 410 may process the AOI data 412, aerial vehicle data 414, and system component data 416 and determine that the AOI 108 in which the system component is located comprises specific terrain that requires a specific type of repair vehicle for safe travel. The repair manager 410 may also utilize this data to determine that the system component is at a given location and has a given configuration that requires a vehicle with a boom of a specific length. The repair manager 410 may further determine that the particular damage or system component requires a specialized crew. The repair manager 410 utilizes the above data to aerial vehicle generate one or more work orders 426 for repairing or replacing a system component(s).

In some embodiments, the repair manager 410 may aerial vehicle provision and/or assign the required equipment, parts, tools, crews, etc. for a given work order. For example, once the repair manager 410 has determined which parts, equipment, tools, crews, etc. are required for servicing a system component the repair manager 410 may communicate with one or more information processing systems to provisions and/or assigns these items to the job. In some embodiments, the repair manager 410 may analyze parts data 430 to determine if the required parts are available. If not, the repair manager 410 may aerial vehicle order the required parts. In addition, the repair manager 410 may communicate with an information processing system at a parts warehouse, dispatch terminal, and/or the like to aerial vehicle provision available parts to the current job. For example, the repair manager 410 may communicate with one or more information processing systems managing the parts inventory and instructs these systems to provision the parts for the current job.

The repair manager 410 may also perform similar operations with respect to the required equipment and tools. For example, the equipment and tool data 430 may comprise data relating to the equipment and tools available to work crews such as a unique identifier of the equipment/tools; type of the equipment/tools; availability of the equipment/tools; location of the equipment/tools; features of the equipment/tools; and/or the like. The repair manager 410 processes this data to identify equipment and tools that satisfy the repair criteria determined by the repair manager 410. When the repair manager 410 identifies equipment and tools that satisfy the repair criteria the repair manager 410 may aerial vehicle provision the equipment and tools for the job. For example, the repair manager 410 may communicate with one or more information processing systems managing the equipment/tool inventory and instructs these systems to provision the equipment/tools for the current job.

The repair manager 410 may also process work crew data 432 to determine particular crews that have attributes and availability that satisfy criteria required to perform the repairs on the system components. For example, the work crew data 432 may include a unique identifier for each work crew; a unique identifier for each individual that is part of the crew; a current location and/or home base of the crew; a current location of each individual crew member and/or the individual's home base; the availability of the work crew and/or each crew member; the specialties of the work crew and/or each individual crew member; contact information for each crew member; and/or the like. The repair manager 410 processes the above data and selects one or more appropriate work crews, makes substitutions of crew members, and/or the like.

Consider an example were the system component to be repaired is a transmission line. The repair manager 410 processes the work crew data 432 to identify a work crew with a specialization in repairing transmission lines. The repair manager 410 may utilize the work crew data 432 to identify a work crew that has a home base closest to the transmission line or to identify another crew if the first crew is currently not available. The repair manager 410 may further utilize the work crew data 432 to determine if each crew member of the identified work crew is current available. If not, the repair manager 410 may substitute in another crew member based on his/her corresponding information within the work crew data 432. Once a crew and its members have been selected, the repair manager 410 may utilize the contact information (e.g., mobile phone number, landline phone number, email address, pager number, etc.) from the work crew data 432 to aerial vehicle send one or more messages to the communication devices of the crew members. These messages at least inform the crew members that they are required to perform one or more jobs.

After the repair manager 410 has processed the inspection data 424, parts data, equipment and tool data 430, and/or work crew data 432 the repair manager 410 aerial vehicle generates one or more work orders 426. The work order 426 may include data such as an identification of the system component to be repaired/replaced; the location of the system component; the problem associated with the system component; the cause of problem; the work crew(s) and its members assigned to perform the repair; repair/replacement instructions; equipment provisioned or required for the repair; parts provisioned or required for the repair; tools provisioned or required for the repair; current and/or expected weather at the location; and/or the like.

Utility Pole and Line Analysis

In response to a storm or hurricane, the aerial vehicle can survey the damage right after the winds reach safe flight conditions. One aspect of the present invention is to target highly impacted Areas of Interest (AOIs). These missions captured LiDAR data for pole analytics and forensics. Captures include both the transmission and distribution network.

Figures 10A, 10B, 10C, 10D:
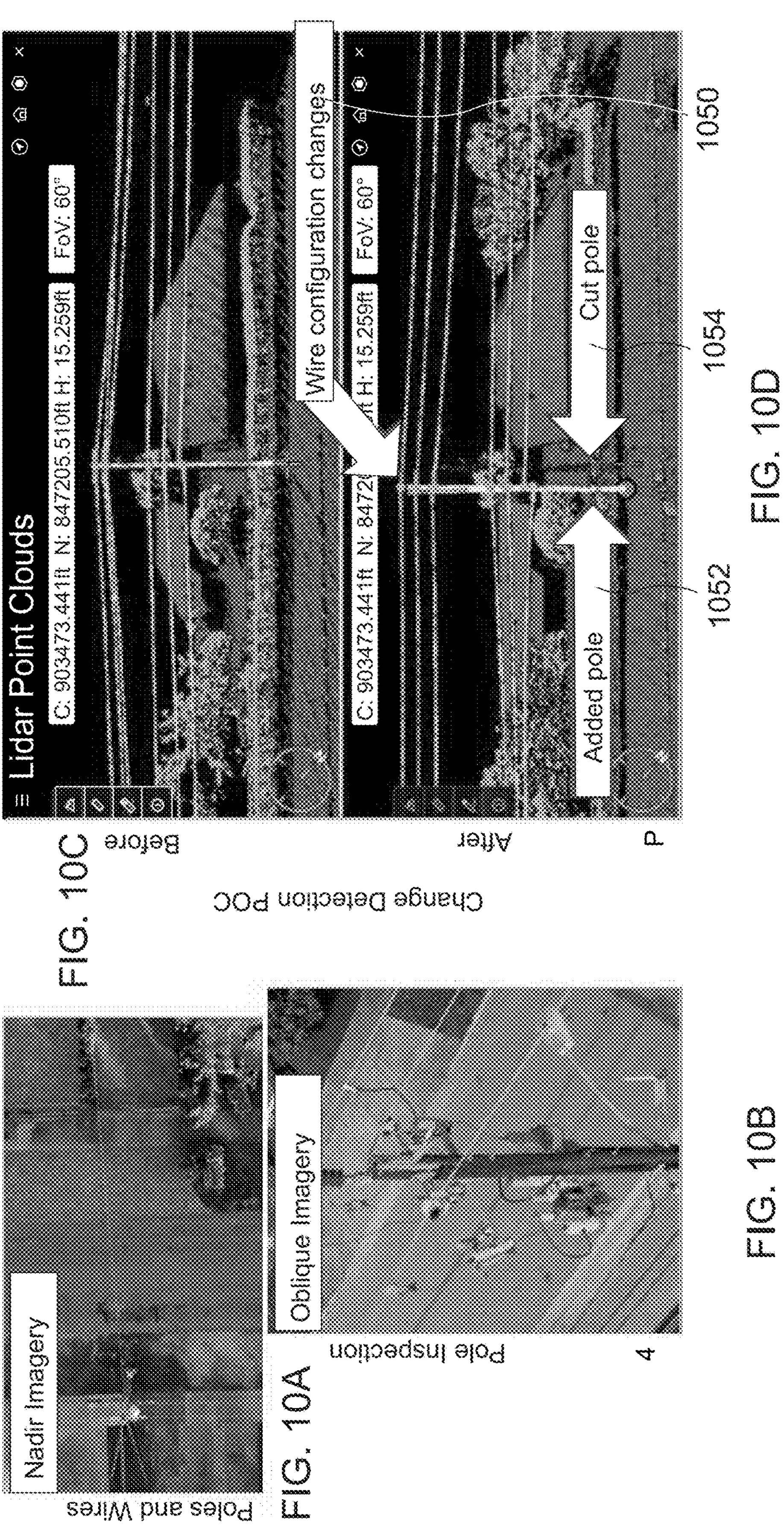
FIG. 10A is imagery of poles and wires taken from above i.e. nadir imagery.
FIG. 10B is imagery of poles and wires at an oblique angle and FIG. 10C is a before a storm and FIG. 10D after a storm LiDAR point clouds, according to one aspect of the present invention.

Turning to FIG. 10A is the imagery of poles and wires taken from above i.e., nadir imagery. This provides a top-down view of the landscape, which is preferable for measuring elevation and creating accurate 3D models. Accurate elevation information, i.e., 3D measurements, are obtained using LiDAR. Aerial imagery provides other data and information, such as flood detection or damage to buildings, roads, and more.

FIG. 10B is the imagery of poles and wires at an oblique angle. FIG. 10C is before a storm, and FIG. 10D after a storm LiDAR point clouds. Notice that in FIG. 10D, the wire configuration change is 1050, pole 1052 is added, and pole 1054 is cut as labeled. Typically, a wire is off the pole and on the ground after a storm.

Figure 11:
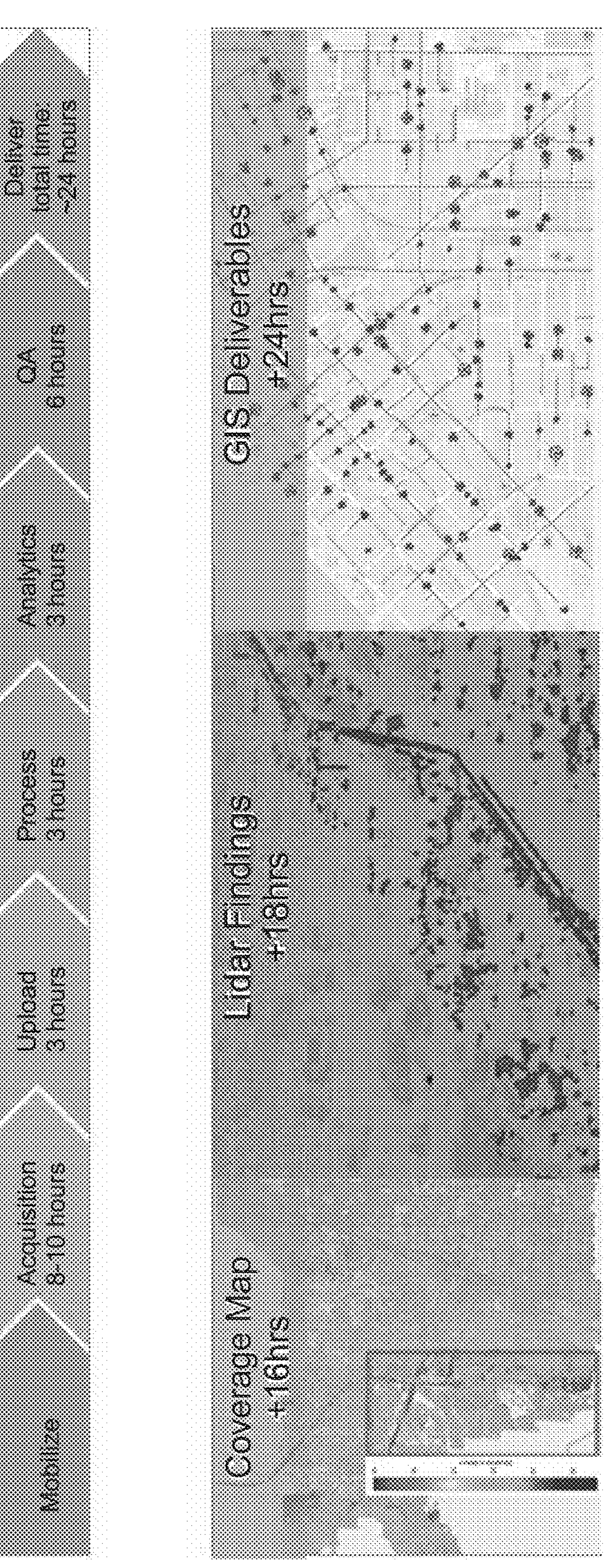
FIG. 11 is pictorial timeline indicating how quickly after a storm the aerial vehicle data is process, analyzed and presented on a map, according to one aspect of the present invention.

FIG. 11 is a pictorial timeline indicating how quickly, after a storm, the aerial vehicle data is processed, analyzed, and presented on a map. In this example, after a storm occurs, the aerial vehicle captures and processes data and identifies changes in infrastructure. These identified changes can then be placed on a map using geographic information system (GIS) mapping techniques, as shown.

Figure 12B:
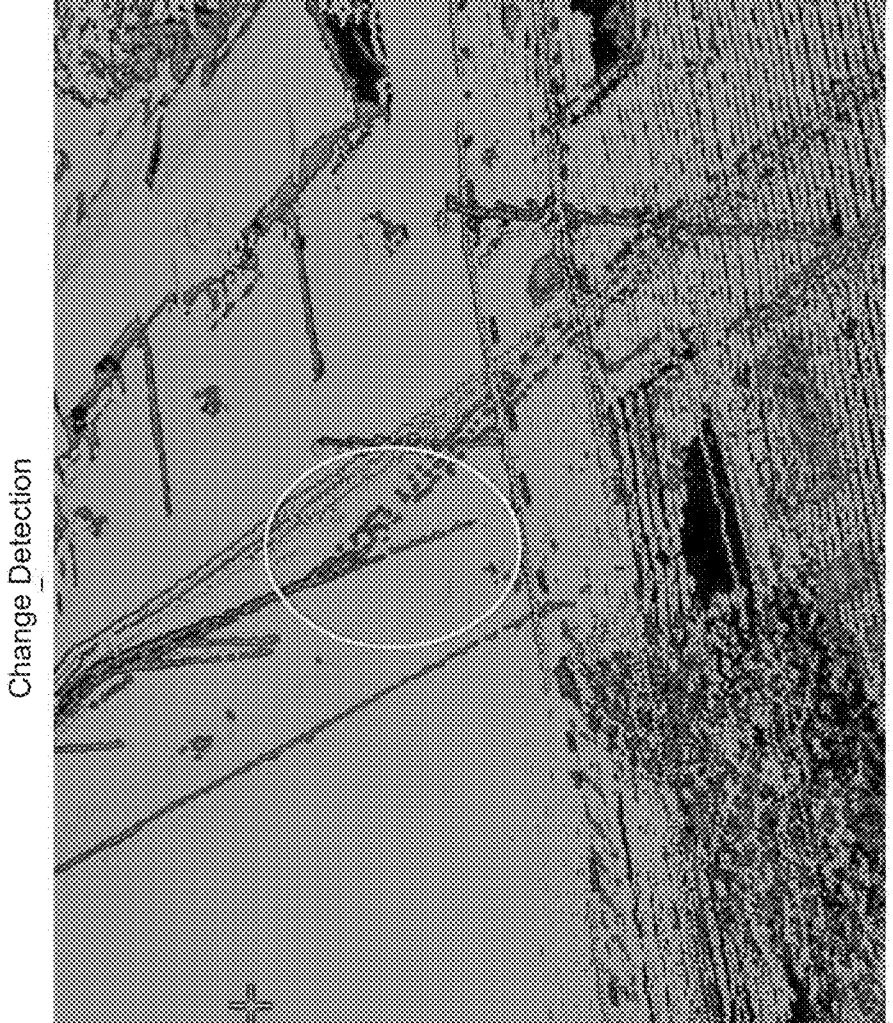
FIG. 12A is a LiDAR point cloud image before a storm and FIG. 12B is point cloud image after a storm with denoting changes in dark shading, according to one aspect of the present invention.
Figure 12A:
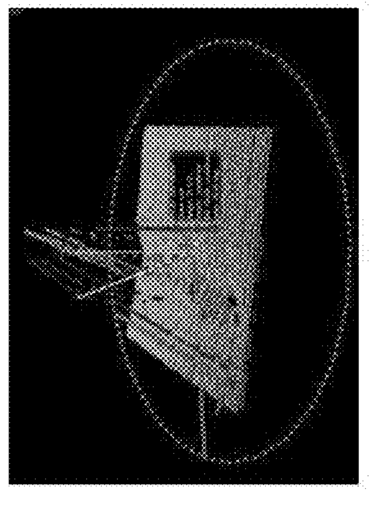

FIG. 12A is a LiDAR point cloud image before a storm, and FIG. 12B is a point cloud image after a storm. Changes may be denoted between the two figures using colors. Detecting change between two LiDAR point clouds is automated. The pole in the LiDAR point cloud is represented as a vector and can be identified using GIS data. Comparing a vector before and after a storm event allows the amount of lean to be calculated. Other techniques, such as converting the point cloud to an image or converting it to an elevational image, rasterizing parts of the LiDAR point cloud, or a combination, may also speed up detecting changes.

One aspect of detecting changes is to concentrate on areas where the utility pole is broken or leaning. A utility pole leaning with more than 10 degrees from the vertical which is regarded as acceptable, but other ranges are possible. A significant lean would be 45 degrees or more compared to an initial collection or GIS layer. If the pole is present after the storm and not significantly tilted, it's considered acceptable. After or post-storm collection, utility poles with more than a 45-degree tilt or many times missing, i.e., no pole identified at that location, are flagged as a problem. In addition, non-storm-related construction in an area may alter poles and wires. The system queries a maintenance database to determine if construction has been ongoing for a given piece of infrastructure equipment.

Figures 13A, 13B:
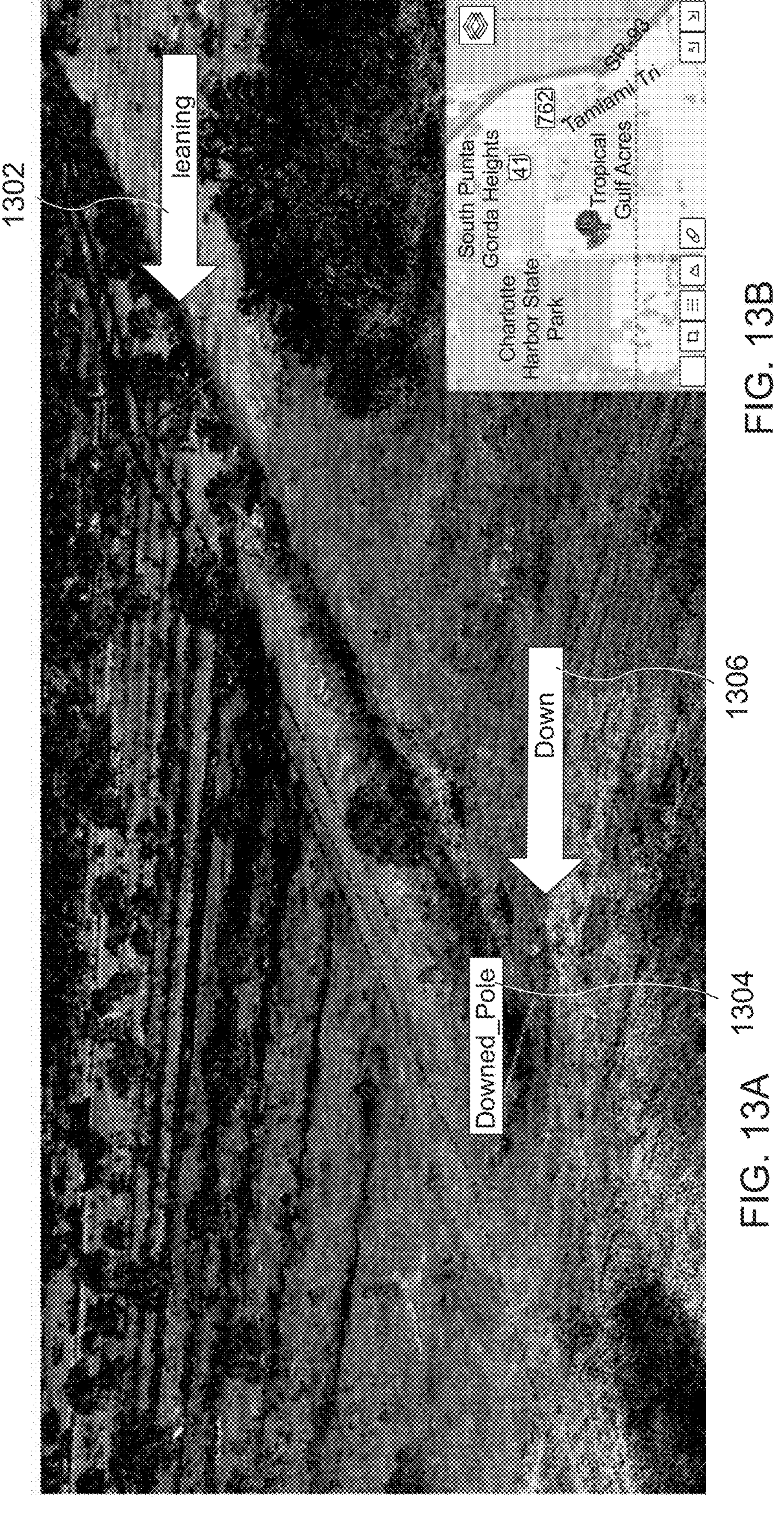
FIG. 13A is a LiDAR point cloud image and FIG. 13B is an aerial view of the location of the LiDAR point cloud, according to one aspect of the present invention.

FIG. 13A is a LiDAR point cloud image. This is a real image after Hurricane Ian in Florida, taken on Sep. 30, 2022. Notice that a leaning utility pole 1302 and down pole 1304, 1306 are identified. FIG. 13B is an aerial map view of the location of the LiDAR point cloud of FIG. 13A.

Figures 14A, 14B:
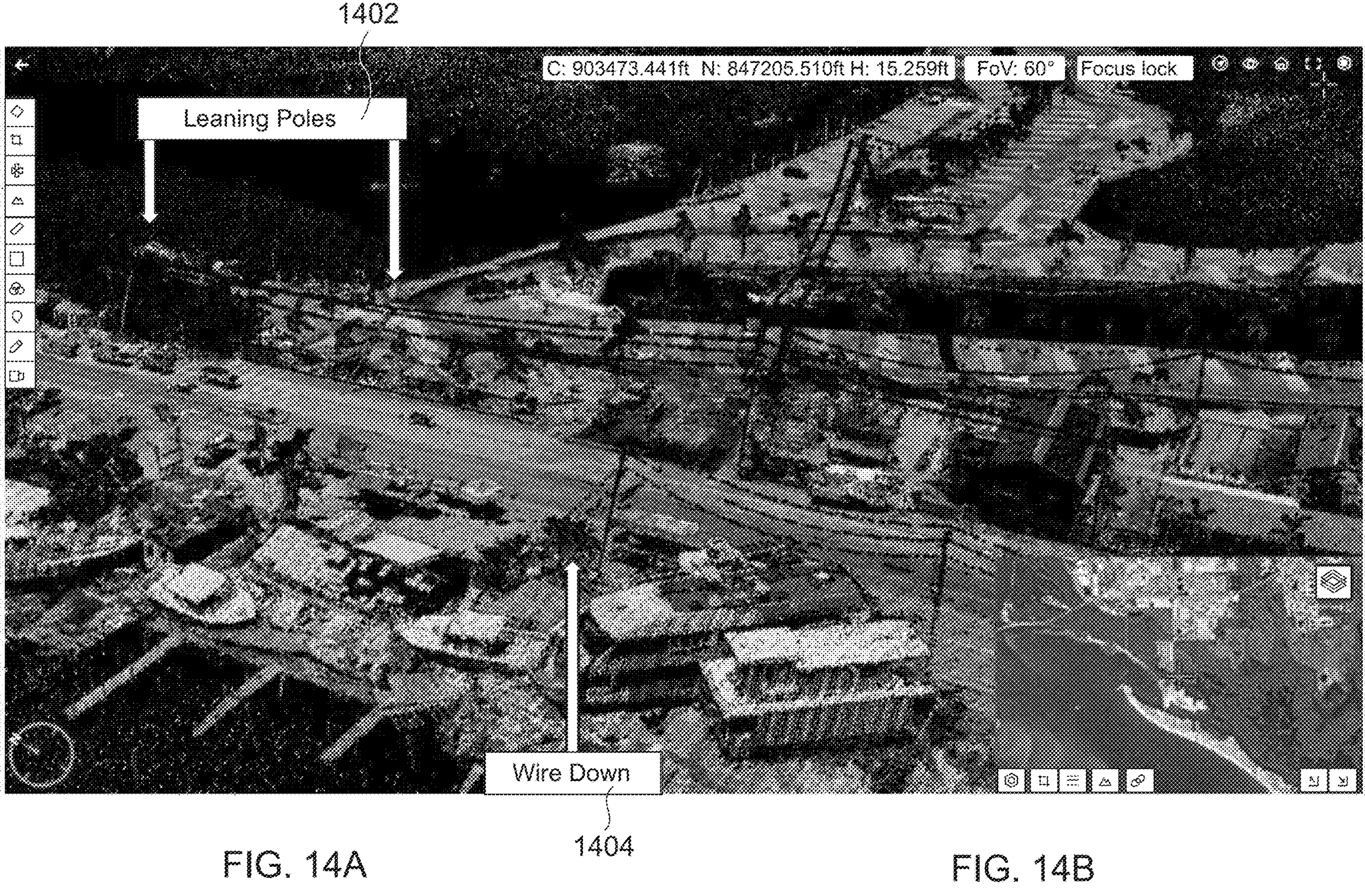
FIG. 14A is a LiDAR point cloud image and FIG. 14B is an aerial view of the location of the LiDAR point cloud, according to one aspect of the present invention.

FIG. 14A is a LiDAR point cloud image. This is a real image after Hurricane Ian in Florida, taken on Sep. 30, 2022. Notice that a leaning pole 1402 and down pole 1404 are identified. FIG. 14B is an aerial map view of the location of the LiDAR point cloud of FIG. 14A.

Utility Pole and Line Analysis Flow

Figure 15A:
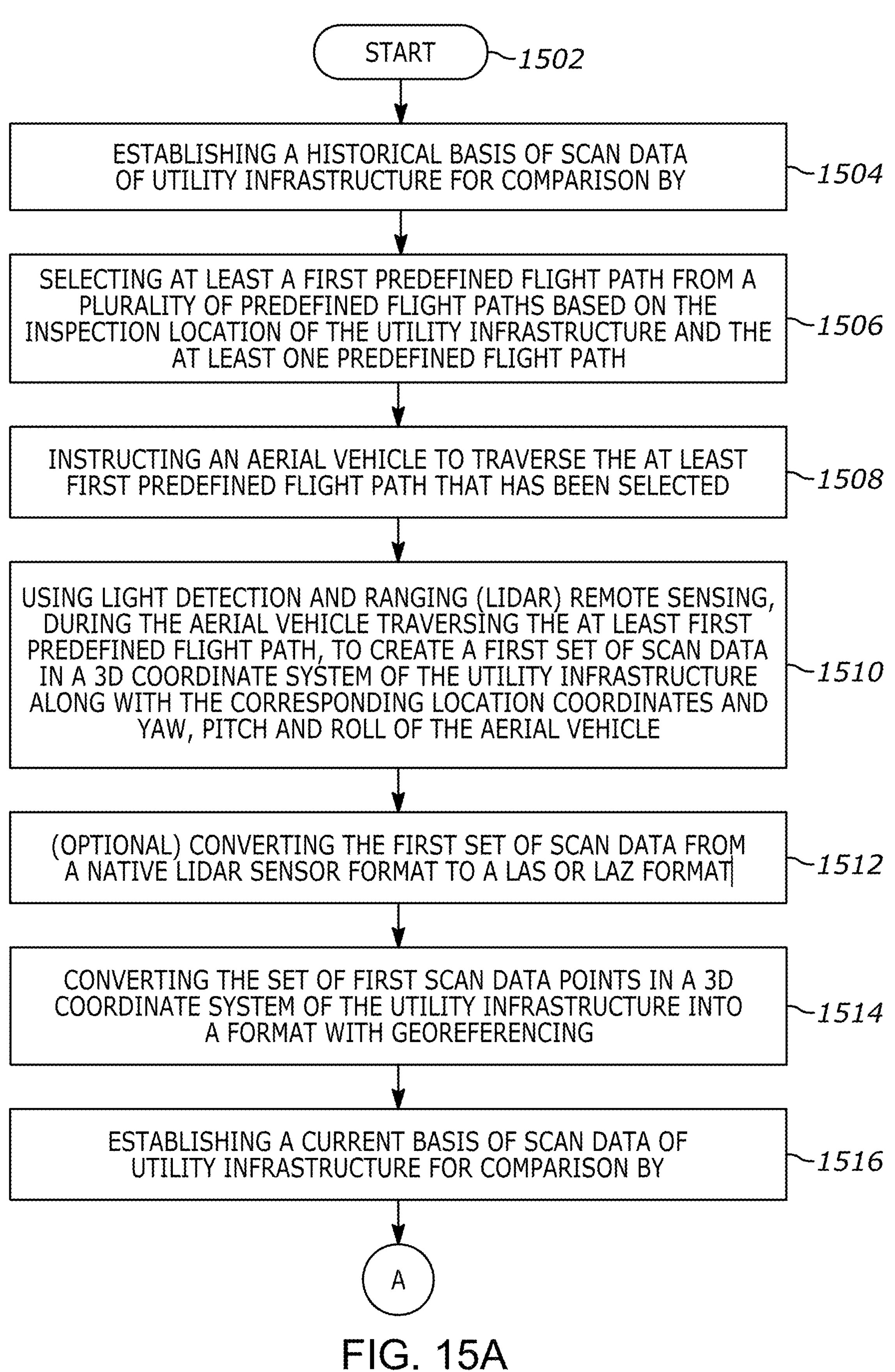
FIG. 15A and FIG. 15B is a flow diagram of the pole and wire damage detection, according to one aspect of the present invention.
Figure 15B:
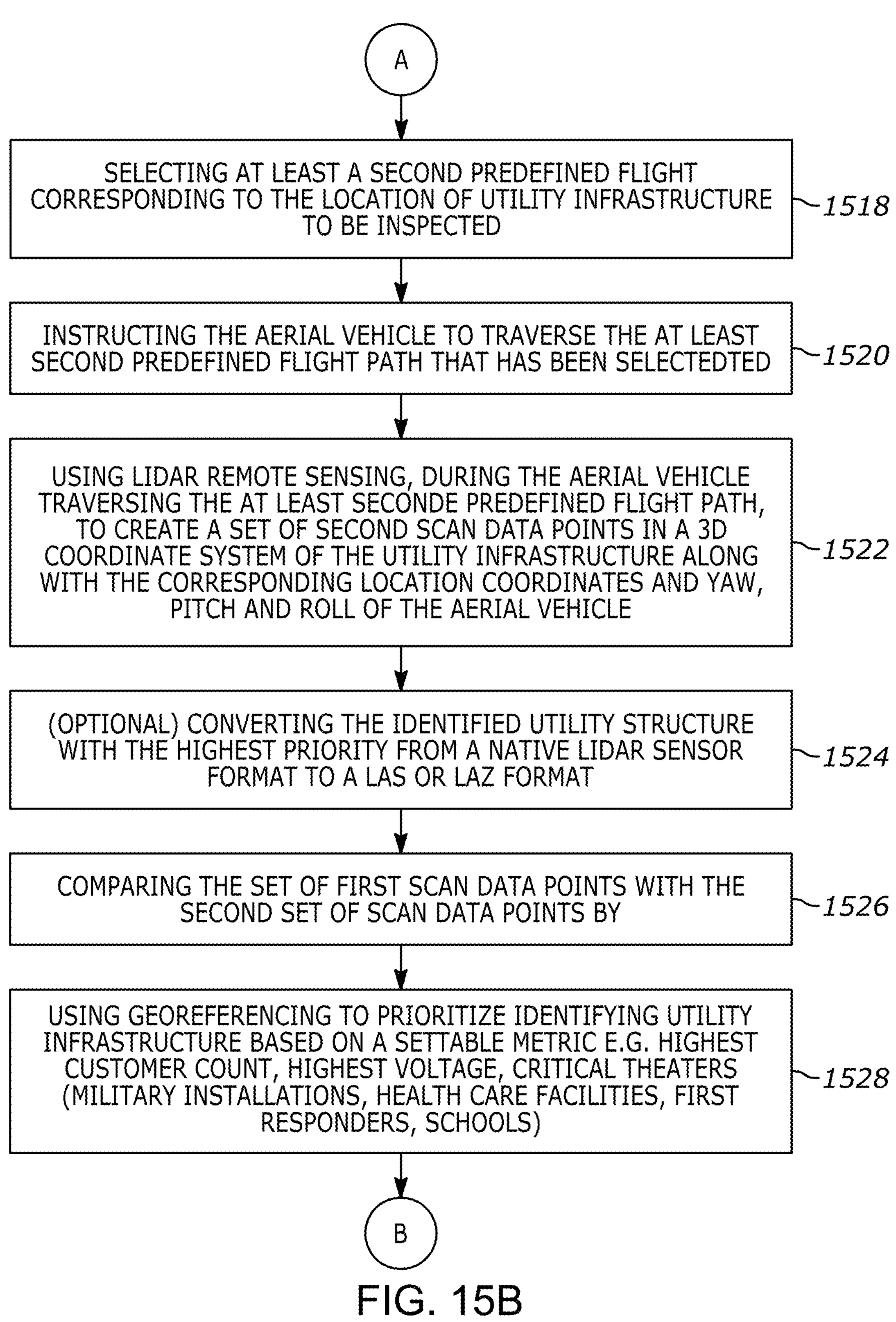
Figure 15C:
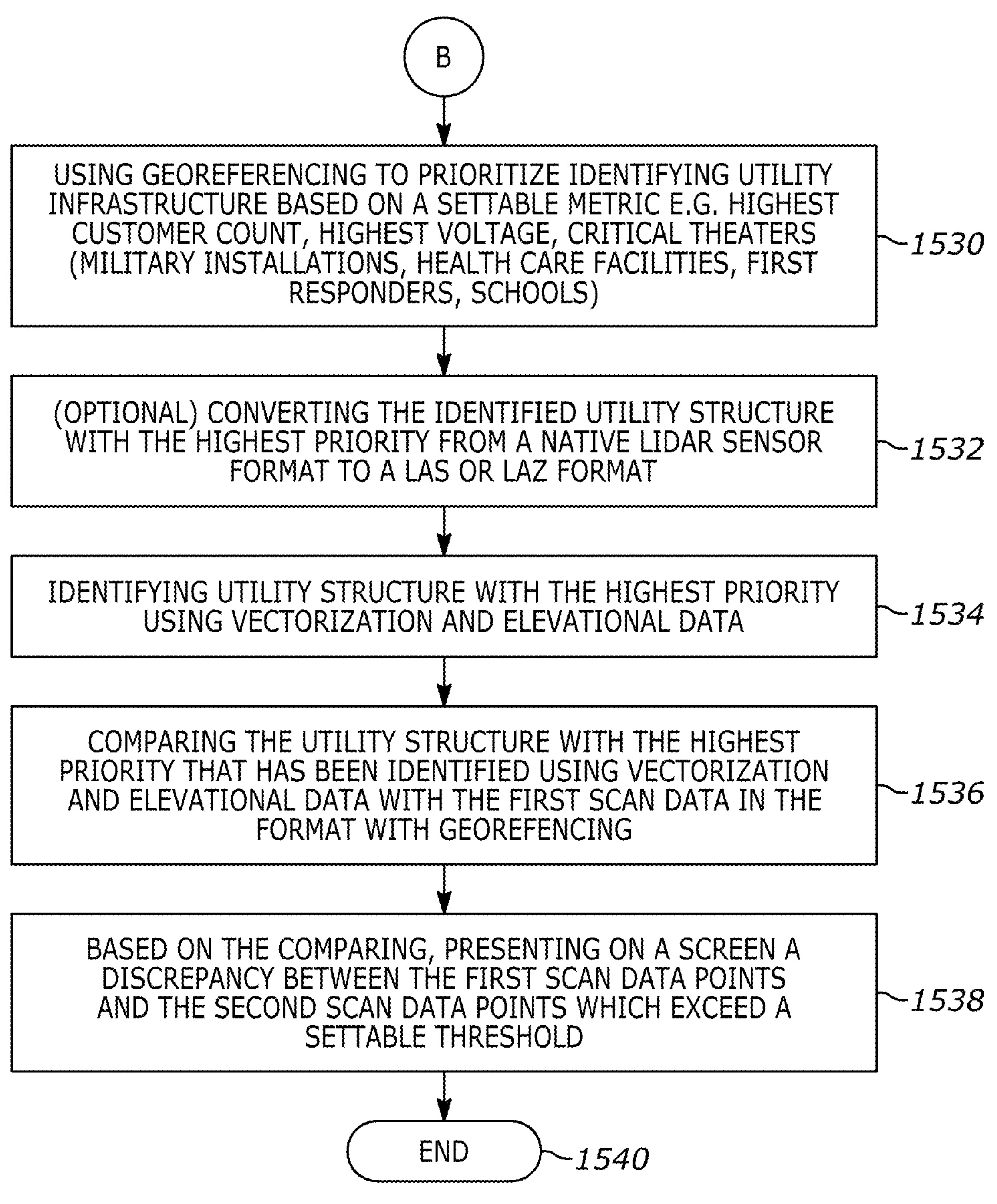

FIG. 15A and FIG. 15B is a flow diagram of pole and wire damage detection according to one aspect of the present invention. The process begins with step 1502 and immediately proceeds to step 1504.

In step 1504, a historical basis of scan data of utility infrastructure for comparison is created in steps 1506 through 1514, as shown. Step 1506, a first predefined flight path is selected from a plurality of predefined flight paths based on the inspection location of the utility infrastructure and the location of the predefined flight. The process continues to step 1508.

In step 1508, a first aerial vehicle is instructed to traverse the selected first predefined flight path. The process continues to step 1510.

In step 1510, a first set of scan data in a 3D coordinate system of the utility infrastructure, along with the corresponding location coordinates and yaw, pitch, and roll of the first aerial vehicle, is created using remote sensing. The remote sensing is performed using light detection and ranging (LiDAR) sensing during the first aerial vehicle traversing the first predefined flight path to create a first set of scan data in a 3D coordinate system of the utility infrastructure along with the corresponding location coordinates and yaw, pitch, and roll of the first aerial vehicle. This data focuses on the 3D geometry of the built environment and may be processed in a highly automated fashion to derive the locations of downed poles and wires. The process continues to step 1512.

In step 1512 is an optional step. The first set of scan data from a native LiDAR sensor is converted to a format, such as a LAS or LAZ format. One example of a native sensor format is RIEGL. This conversion can happen in real-time during the flight onboard the first aerial vehicle or through cloud computing. The process continued to step 1514.

In step 1514, the set of first scan data points in a 3D coordinate system of the utility infrastructure is converted into a format with georeferencing. Examples of georeferencing include GeoTiff formats. One example is rasterizing a point cloud, such as converting it to a 2.5D grid. This rasterized point cloud is exported to a new cloud or raster scan, such as GeoTiff.

The process continued to step 1516.

In step 1516, a current basis of scan data of utility infrastructure is established for comparison. The process continues to step 1518.

In step 1518, select a second predefined flight corresponding to the location of utility infrastructure to be inspected. The second predefined flight path and the first predefined path may be the same flight path or different. The process continues to step 1520.

In step 1520, a second aerial vehicle is instructed to traverse the second predefined flight path that has been selected. The second aerial vehicle may the same aerial vehicle as the first aerial vehicle or different. The process continues to step 1522.

In step 1522, a set of second scan data points in a 3D coordinate system of the utility infrastructure, along with the corresponding location coordinates and yaw, pitch, and roll of the aerial vehicle, is created. These second scan data points are constructed using LiDAR remote sensing when the second aerial vehicle traverses the second predefined flight path. Again, this data focuses on the 3D geometry of the built environment and may be processed in a highly automated fashion to derive the locations of downed poles and wires. One example is rasterizing a point cloud, such as converting it to a 2.5D grid. This rasterized point cloud is exported to a new cloud or raster scan, such as GeoTiff. The process continues to step 1524.

Portions of Step 1524 may be optional. In step 1524, the identified utility structure is converted with the highest priority from a native LiDAR sensor format to a LAS or LAZ format. In one example, LiDAR data is only converted within the immediate vicinity of the utility infrastructure to save on processing and upload time. The system would allow areas of interest to be defined for conversion from LiDAR to LAS or LAZ format around the electric utilities to speed up the processing. The prioritization includes identifying utility infrastructure based on settable metrics (e.g., the highest customer count, the highest voltage, the highest volume (for gas or water or waste), and critical theatres (military installations, health care facilities, first responders, schools). The process continues to step 1526.

In step 1526, the set of first scan data points is compared with the second set of scan data points through steps 1528 to 1536, as shown. The process continues to step 1528.

In step 1528, utility infrastructure is prioritized to be identified based on a settable metric, e.g., highest customer count, highest voltage, critical theaters (military installations, health care facilities, first responders, schools). The process continues to step 1530.

Step 1530 is an optional step. The identified utility structure with the highest priority is converted from a native LiDAR sensor format to a LAS or LAZ format. The process continues to step 1532.

In step 1532, the utility structure with the highest priority is identified using georeferencing with vectorization and elevational data. The process continues to step 1534.

In step 1534, the utility structure with the highest priority, which has been identified using vectorization and elevational data, is compared with the first scan data in the format of georeferencing. The process continues to step 1536.

In step 1536, based on the comparison, a discrepancy between the first scan data points and the second scan data points is presented on a screen, which exceeds a settable threshold. The process continues to step 1538, at which point the process ends.

The prioritized comparison may use utility infrastructure converted to a rasterized surface model and 3-point cloud of LIDAR. Point cloud vectorization is a process that allows users to draw lines from the points of a 3D point cloud. For example, in an electric utility environment, vectorization can be used to draw wires, cables and utility poles.

The prioritization for utility poles is generally that transmission poles are assigned a higher priority than feeder poles. Likewise, feeder poles are typically assigned a higher priority than lateral poles. Moreover, Laterals have less visibility due to their lower height and tree cover, which make changes harder to detect.

This data focuses on the 3D geometry of the built environment and may be processed in a highly automated fashion to derive the locations of downed poles and wires. For example, the comparison of the utility infrastructure with the highest priority that has been identified using vectorization and elevational data with the first set of scan data using georeferencing to identify missing utility structure poles and utility structure poles that exceed a settable tilt angle. For example, a title angle of more than 10 or 15 degrees but other ranges are possible. Wires on the ground rather than sag and sway are the primary focus of identifying abnormalities.

The present method may also filter out missing poles if active constructions is scheduled in a given area to reduce false positive.

Information Processing System

Figure 16:
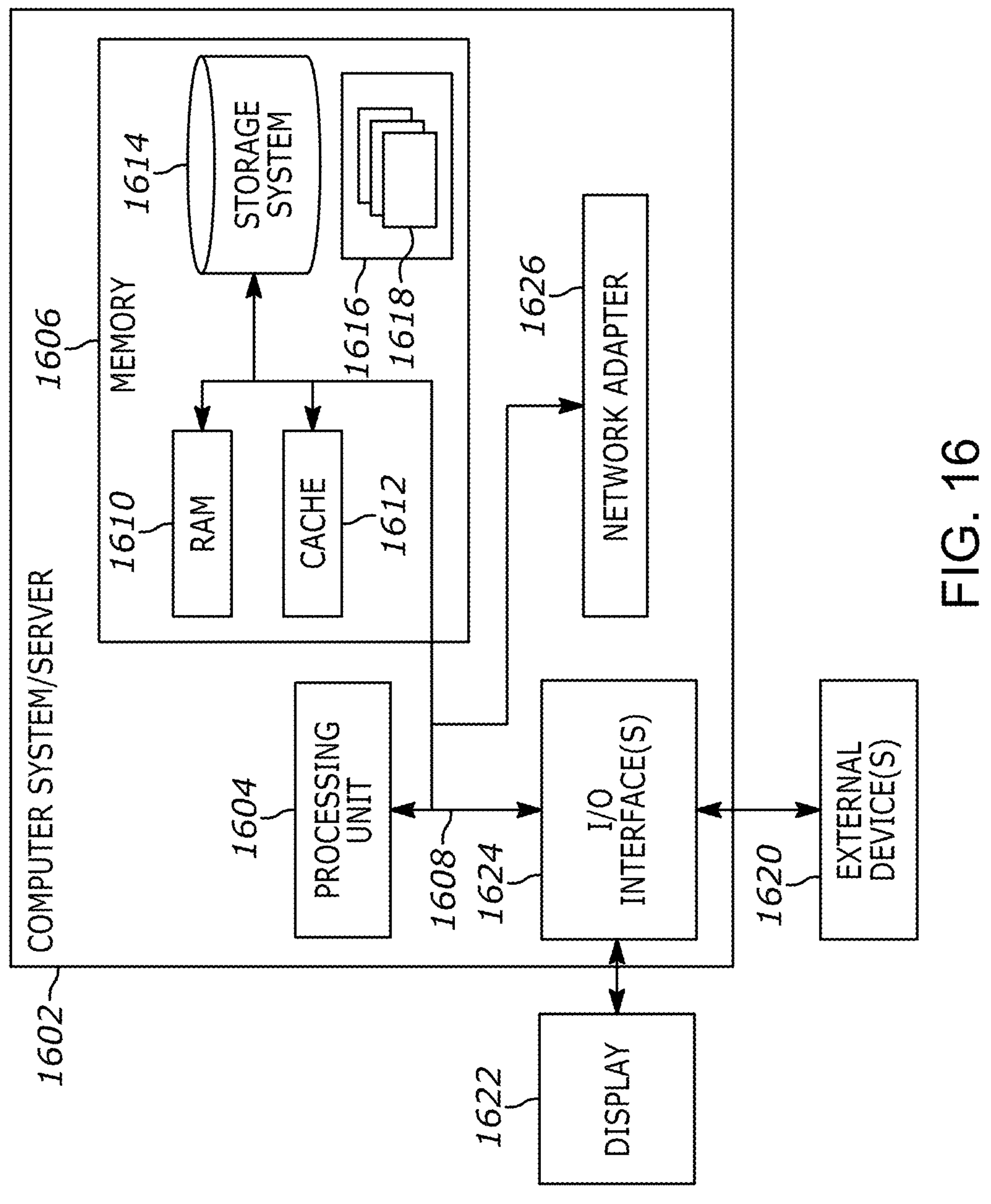
FIG. 16 is a block diagram illustrating another example of an information processing system according to one aspect of the present invention.

Referring now to FIG. 16, this figure is a block diagram illustrating an information processing system that can be utilized in embodiments of the present invention. The information processing system 1602 is based upon a suitably configured processing system configured to implement one or more embodiments of the present invention such as the inspection manager 408 of FIG. 4 or flow chart of FIGS. 15A and 15B. The components of the information processing system 1602 can include, but are not limited to, one or more processors or processing units 1604, a system memory 1606, and a bus 1608, which couples various system components including the system memory 1606 to the processor 1604. The bus 1608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1606 may include computer system readable media in the form of volatile memory, such as random access memory (RAM) 1610 and/or cache memory 1612. The information processing system 1602 can further include other removable/non-removable, volatile/non-volatile computer system storage media. By way of example only, a storage system 1614 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1608 by one or more data media interfaces. The memory 1606 can include at least one program product having a set of program modules that are configured to carry out the functions of an embodiment of the present invention.

Program/utility 1616, having a set of program modules 1618, may be stored in memory 1606 by way of example, and not limitation, as well as an operating system, one or more application programs, other program modules, and program data. Each of the operating system, one or more application programs, other program modules, and program data or some combination thereof, may include an implementation of a networking environment. Program modules 1618 generally carry out the functions and/or methodologies of embodiments of the present invention.

The information processing system 1602 can also communicate with one or more external devices 1620 such as a keyboard, a pointing device, a display 1622, etc.; one or more devices that enable a user to interact with the information processing system 1602; and/or any devices (e.g., network card, modem, etc.) that enable computer system/server 1602 to communicate with one or more other computing devices. Such communication can occur via I/O interfaces 1624. Still yet, the information processing system 1602 can communicate with one or more networks such as a local area network (LAN), a general wide area network (WAN), and/or a public network (e.g., the Internet) via network adapter 1626. As depicted, the network adapter 1626 communicates with the other components of information processing system 1602 via the bus 1608. Other hardware and/or software components can also be used in conjunction with the information processing system 1602. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for detecting an abnormality on a utility infrastructure, the method comprising:

establishing a historical basis of scan data of utility infrastructure for comparison by selecting at least a first predefined flight path from a plurality of predefined flight paths based a location of utility infrastructure to be inspected;

instructing a first aerial vehicle to traverse at least the first predefined flight path that has been selected; and using Light Detection and Ranging (LiDAR) remote sensing during the first aerial vehicle traversing the at least first predefined flight path, to create a first set of scan data in a 3D coordinate system of the utility infrastructure along with corresponding location coordinates and yaw, pitch, and roll of the first aerial vehicle;

establishing a current basis of scan data of utility infrastructure for comparison by selecting a second predefined flight corresponding to the location of utility infrastructure to be inspected;

instructing a second aerial vehicle to traverse at least the second predefined flight path that has been selected; and using Lidar remote sensing, during the second aerial vehicle traversing the at least second predefined flight path, to create a second set of scan data in a 3D coordinate system of the utility infrastructure along with corresponding location coordinates and yaw, pitch, and roll of the second aerial vehicle;

comparing the first set of scan data with the second set of scan data by using georeferencing to prioritize identifying utility infrastructure based on settable metrics, critical theatres;

identifying utility infrastructure with a highest priority using vectorization and elevational data;

comparing the utility infrastructure with the highest priority that has been identified using vectorization and elevational data with the first set of scan data using georeferencing; and based on the comparing, presenting on a screen, a discrepancy between the first set of scan data and the second set of scan data corresponding to the utility infrastructure with the highest priority that has been identified, which exceeds a settable threshold.

2. The computer-implemented method of claim 1, wherein the establishing the current basis of scan data of utility infrastructure for comparison further includes:

processing of the second set of scan data while the second aerial vehicle is in flight.

3. The computer-implemented method of claim 2, wherein the processing of the first set of scan data includes converting the first set of scan data into one or a LAS format or LAZ format.

4. The computer-implemented method of claim 1, further comprising:

converting the first set of scan data in 3D coordinate system and the second set of scan data in 3D coordinate space by rasterization into a 2.5 grid; and wherein the comparing the utility infrastructure with the highest priority that has been identified using vectorization and elevational data with the first set of scan data using georeferencing includes comparing the first set of scan data in 2.5 grid with the second set of scan data in a 2.5 grid.

5. The computer-implemented method of claim 1, wherein the comparing the utility infrastructure with the highest priority that has been identified using vectorization and elevational data with the first set of scan data using georeferencing to identify missing utility structure poles and utility structure poles that exceed a settable tilt angle is performed automatically using image comparison without human intervention.

6. The computer-implemented method of claim 5, wherein the comparing the utility infrastructure with the highest priority that has been identified using vectorization and elevational data with the first set of scan data using georeferencing is performed using machine learning in which utility infrastructure undergoing maintenance is used to remove false positives of missing utility structure poles and utility structure poles that exceed a settable tilt angle.

7. The computer-implemented method of claim 1, wherein the comparing the utility infrastructure with the highest priority that has been identified using vectorization and elevational data with the first set of scan data using georeferencing to identify missing utility structure poles and utility structure poles that exceed a settable tilt angle.

8. The computer-implemented method of claim 1, wherein the first and second aerial vehicles are manned or unmanned.

9. The computer-implemented method of claim 1, wherein the using georeferencing to prioritize identifying utility infrastructure based on settable metrics, is one of a utility with a highest customer count, a highest voltage, a highest volume, critical theatres, or a combination thereof.

10. The computer-implemented method of claim 1, wherein the critical theatres is one of military installations, health care facilities, first responders, schools, or a combination thereof.

11. An information processing system for detecting an abnormality on a utility infrastructure, the information processing system comprising:

a processor;

memory communicatively coupled to the processor; and an inspection manager communicatively coupled to the processor and the memory that, when operating:

selecting at least a first predefined flight path from a plurality of predefined flight paths based a location of utility infrastructure to be inspected;

instructing a first aerial vehicle to traverse at least the first predefined flight path that has been selected; and using Light Detection and Ranging (LiDAR) remote sensing during the first aerial vehicle traversing at least the first predefined flight path, to create a first set of scan data in a 3D coordinate system of the utility infrastructure along with corresponding location coordinates and yaw, pitch, and roll of the first aerial vehicle;

establishing a current basis of scan data of utility infrastructure for comparison by selecting a second predefined flight corresponding to the location of utility infrastructure to be inspected;

instructing a second aerial vehicle to traverse at least the second predefined flight path that has been selected; and using Lidar remote sensing, during the second aerial vehicle traversing at least the second predefined flight path, to create a second set of scan data in a 3D coordinate system of the utility infrastructure along with corresponding location coordinates and yaw, pitch, and roll of the second aerial vehicle;

comparing the first set of scan data with the second set of scan data by using georeferencing to prioritize identifying utility infrastructure based on settable metrics, critical theatres;

identifying utility infrastructure with a highest priority using vectorization and elevational data;

comparing the utility infrastructure with the highest priority that has been identified using vectorization and elevational data with the first set of scan data using georeferencing; and based on the comparing, presenting on a screen, a discrepancy between the first set of scan data and the second set of scan data corresponding to the utility infrastructure with the highest priority that has been identified, which exceeds a settable threshold.

12. The information processing system of claim 11, wherein the establishing the current basis of scan data of utility infrastructure for comparison further includes:

processing of the second set of scan data while the second aerial vehicle is in flight.

13. The information processing system of claim 12, wherein the processing of the first set of scan data includes converting the first set of scan data into one or a LAS format or LAZ format.

14. The information processing system of claim 11, further comprising:

converting the first set of scan data in 3D coordinate system and the second set of scan data in 3D coordinate space by rasterization into a 2.5 grid; and wherein the comparing the utility infrastructure with the highest priority that has been identified using vectorization and elevational data with the first set of scan data using georeferencing includes comparing the first set of scan data in 2.5 grid with the second set of scan data in a 2.5 grid.

15. The information processing system of claim 11, wherein the comparing the utility infrastructure with the highest priority that has been identified using vectorization and elevational data with the first set of scan data using georeferencing to identify missing utility structure poles and utility structure poles that exceed a settable tilt angle is performed automatically using image comparison without human intervention.

16. The information processing system of claim 15, wherein the comparing the utility infrastructure with the highest priority that has been identified using vectorization and elevational data with the first set of scan data using georeferencing is performed using machine learning in which utility infrastructure undergoing maintenance is used to remove false positives of missing utility structure poles and utility structure poles that exceed a settable tilt angle.

17. The information processing system of claim 11, wherein the comparing the utility infrastructure with the highest priority that has been identified using vectorization and elevational data with the first set of scan data using georeferencing to identify missing utility structure poles and utility structure poles that exceed a settable tilt angle.

18. The information processing system of claim 11, wherein the first and second aerial vehicles are manned or unmanned.

19. The information processing system of claim 11, wherein the using georeferencing to prioritize identifying utility infrastructure based on settable metrics, is one of a utility with a highest customer count, a highest voltage, a highest volume, critical theatres, or a combination thereof.

20. The information processing system of claim 11, wherein the critical theatres is one of military installations, health care facilities, first responders, schools, or a combination thereof.

* * * * *